United States Patent
Hamada et al.

(10) Patent No.: US 8,625,398 B2
(45) Date of Patent: Jan. 7, 2014

(54) INFORMATION PROCESSING DEVICE, INFORMATION RECORDING MEDIUM, INFORMATION PROCESSING METHOD, AND PROGRAM

(75) Inventors: Toshiya Hamada, Saitama (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/380,140

(22) PCT Filed: Jun. 30, 2010

(86) PCT No.: PCT/JP2010/061159
§ 371 (c)(1), (2), (4) Date: Dec. 22, 2011

(87) PCT Pub. No.: WO2011/007671
PCT Pub. Date: Jan. 20, 2011

(65) Prior Publication Data
US 2012/0099408 A1    Apr. 26, 2012

(30) Foreign Application Priority Data

Jul. 15, 2009   (JP) ................................. 2009-167300

(51) Int. Cl.
*G11B 27/36* (2006.01)

(52) U.S. Cl.
USPC ...................... 369/53.2; 369/30.07

(58) Field of Classification Search
None
See application file for complete search history.

(56) References Cited

U.S. PATENT DOCUMENTS

| | | | |
|---|---|---|---|
| 2005/0175326 A1* | 8/2005 | Kim et al. ...................... | 386/126 |
| 2007/0081669 A1* | 4/2007 | Takashima et al. ........... | 380/212 |
| 2007/0189718 A1 | 8/2007 | Kobayashi et al. | |
| 2007/0194117 A1* | 8/2007 | Takashima et al. ........... | 235/454 |
| 2007/0286565 A1* | 12/2007 | Watanabe ....................... | 386/37 |
| 2008/0063200 A1* | 3/2008 | Takashima et al. ........... | 380/201 |
| 2009/0003172 A1* | 1/2009 | Yahata et al. ............. | 369/53.41 |
| 2009/0204572 A1 | 8/2009 | Takashima et al. | |
| 2009/0279852 A1* | 11/2009 | Morimoto et al. ............. | 386/95 |
| 2010/0061702 A1 | 3/2010 | Tanaka et al. | |

FOREIGN PATENT DOCUMENTS

| | | |
|---|---|---|
| WO | 2006 100879 | 9/2006 |
| WO | 2008 099647 | 8/2008 |

OTHER PUBLICATIONS

U.S. Appl. No. 13/382,700, filed Jan. 6, 2012, Hamada, et al.
International Search Report Issued Aug. 17, 2010 in PCT/JP10/61159 Filed Jun. 30, 2010.

* cited by examiner

*Primary Examiner* — Thang Tran
(74) *Attorney, Agent, or Firm* — Oblon, Spivak, McClelland, Maier & Neustadt, L.L.P.

(57) ABSTRACT

A data recording and reproducing configuration in which both of BDMV standard compliant data and BDMV standard non-compliant data can be used is realized. A plurality of directories are set in a recording media, and a recording destination directory is selected according to the types of data. The BDMV standard compliant data is recorded in a BDMV directory, and the BDMV standard non-compliant data, for example, 1080/60p or 3D image data are recorded in a BDAV or BU directory. At the time of data reproducing process, a virtual file system in which the recorded data in the BDMV directory and the recorded data in the BDAV/BU directory are consolidated is constructed to achieve the reproducing process. With this configuration, the recording and reproducing of the BDMV standard compliant data and the BDMV standard non-compliant data are achieved.

9 Claims, 14 Drawing Sheets

FIG.3

| | | BDMV | BDAV |
|---|---|---|---|
| (a) | RECORDING AND REPRODUCING PERMITTED DATA | RESTRICTION OF DATA FORMAT WHICH CAN BE RECORDED AND REPRODUCED IS STRICT. FOR EXAMPLE, RECORDING AND REPRODUCING OF 1080/60p IMAGES, 3D IMAGES, 4K × 2K IMAGES ARE NOT PERMITTED. | RESTRICTION OF DATA FORMAT WHICH CAN BE RECORDED AND REPRODUCED IS NOT STRICT. FOR EXAMPLE, RECORDING AND REPRODUCING OF 1080/60p IMAGES, 3D IMAGES, 4K × 2K IMAGES ARE PERMITTED. |
| (b) | MENU | HIGH QUALITY MENU WHICH CAN UTILIZE ADVANCED DESIGNS OR FUNCTIONS HAVING VARIOUS DISPLAY FORMATS CAN BE CREATED, DISPLAYED, AND UTILIZED. | DISPLAY OF THUMBNAIL IMAGES CORRESPONDING TO STREAM FILE |
| (c) | INTERACTIVE FUNCTION | ADVANCED INTERACTIVE FUNCTION ON THE BASIS OF PRESENTATION AND UTILIZATION OF VARIOUS OPERATING BUTTONS CAN BE PROVIDED. | ADVANCED INTERACTIVE FUNCTION IS NOT PROVIDED |

FIG.6

| SOURCE FILE NAME (src_file_name)<br>(FILE NAME IN LOCAL MEMORY) | DESTINATION FILE NAME (dst_file_name)<br>(FILE NAME ON VIRTUAL FILE SYSTEM (VFS)) |
|---|---|
| 1/100/index.bdmv | BDMV/index.bdmv |
| 1/100/MovieObject.bdmv | BDMV/MovieObject.bdmv |
| 1/100/00001.mpls | BDMV/PLAYLIST/00001.mpls |
| 1/100/01010.clpi | BDMV/CLIPINF/01010.clpi |
| 1/100/01011.clpi | BDMV/CLIPINF/01011.clpi |
| 1/100/01010.m2ts | BDMV/STREAM/01010.m2ts |
| 1/100/01011.m2ts | BDMV/STREAM/01011.m2ts |

INFORMATION PROCESSING DEVICE, INFORMATION RECORDING MEDIUM, INFORMATION PROCESSING METHOD, AND PROGRAM

TECHNICAL FIELD

The present invention relates to an information processing apparatus, an information recording medium and an information processing method, and a program. More specifically, the present invention relates to an information processing apparatus, an information recording medium and an information processing method, and a program which are configured to execute a data recording process or a data reproducing process using recording media such as disks, flash memories and the like.

BACKGROUND ART

For example, recording and reproducing apparatuses such as PCs, video cameras, players, recorders, and the like perform data recording and reproducing using various media such as disk-type media including hard disk, DVDs, Blu-ray Discs (Registered Trademark) and the like, and flush memories.

When the data recording and reproducing is performed using these media, the data recording and reproducing apparatus performs a data recording and reproducing process according to a format defined in advance by applying a recording and reproducing application compliant with a predetermined standard. For example, examples of application standards for recording and reproducing a high-definition high-vision video include BDMV and BDAV. These application standards are designed as application standards for data recording and reproducing using mainly a BD (Blu-ray Disc (registered trademark)). The BD standard is described, for example, in Patent Document 1 (JP-A-2007-179671).

Although the BDMV or the BDAV are application standards for the data recording and reproducing using mainly the BD as described above, the recording media is not limited to the BD, and are data recording and reproducing application standards which are applicable to the data recording and reproducing using not only the BD, but also other media such as flush memories as the recording medium.

The BDMV is an application standard developed for BD-ROMs in which, for example, movie contents or the like are recorded in advance and, principally, is widely used as BD-ROMs which do not allow rewriting of packaged contents or the like. The BDMV is characterized in that navigation commands or BD-J as programs for controlling reproduction according to a user's operation are stored in a disk to provide an interactive function intended by a content producer. The BDMV is also characterized in that recording and reproducing using a menu screen including graphics and buttons are enabled.

For reference sake, the BDMV has several versions and, for example, BD-RE 3.0 standard, which is one of standards of the BDMV, is an application standard which is applicable also to recordable BD disks.

In contrast, the BDAV is an application standard developed for the purpose of being used for BD-RES which are rewritable and BD-Rs which allow recording only once.

The BDAV is, for example, a standard used very often for recording and reproducing videos shot by the users using a video camera or the like or for recording and reproducing TV programs using a video recorder or the like. The BDAV does not have an interactive function or a program for realizing creation of a menu in various designs or a display process like the BDMV and does not have a function such as a button display process. The menu provided by the BDAV standard are simple listed data made up of thumbnail images. If utilization of the menu in various designs or the interactive function provided by the BDMV standard is wanted, a program on the side of the recording and reproducing apparatus is used. In other words, there is no other choice than using, for example, functions integrated on the side of a recorder or a player.

The BDMV standard is a standard designed for the purpose of not hindering reproduction of the packaged contents such as movies recorded in the BD using BD-ROM players which are already diffused widely. In order to ensure reproduction compatibility, specifications are strictly defined by a standards organization being named as BDA (Blu-ray Disc Association).

The BDMV standard also imposes limitations on modes of data of contents to be recorded in media such as a disk and the like. More specifically, for example, data which can be recorded as HD (High Definition) images is defined to be only data of predetermined formats such as 1080/60i and 1080/50i. The expression [1080/60i] indicates that HD (High Definition) images having 1920×1080 pixels are recorded and reproduced on the basis of 1080 lines as 60 field images per second using an interlace system. The symbol [i] denotes the interlace system. In this connection, a progressive system is denoted by [p].

The present high-vision data is defined as an image of 1920×1080 pixels. However, apparatuses which are capable of recording and reproducing images of approximately 4000× 2000 pixels (=4K×2K) as higher-definition images are developed. In addition, various apparatuses such as [1080/60p] which performs recording and reproducing in the progressive system, which is different from the interlace system described above, or apparatuses which perform recording and reproducing for right eye images and left eye images for 3D images, which are three-dimensional images, have been developed. In particular, the video cameras developed in recent years are capable of recording 1080/60p images described above, 3D images, or 4K×2K images, and are considered to be used widely in the future.

However, as described above, the current BDMV standard does not allow the 4K×2K images or 1080/60p, and 3D image data as recording and reproducing data. Therefore, there is a problem in that even when the super high-definition images of 4 k×2 k are generated as the recording data, data recording conforming the existing BDMV standard cannot be performed.

In contrast, the BDAV standard allows recording of AV data in various formats on the precondition of being used in recorders. Therefore, there is no constraint of reproduction compatibility except that part of the AV data formats must be absolutely reproducible. Therefore, the BDAV has flexibility in expansion of standards in comparison with the BDMV. In other words, the 4K×2K images or 1080/60p, and 3D image data can be set as the recording and reproducing data. However, there is a problem in that the interactive function and the menu screen made up of graphics and buttons cannot be used as described above.

It is also possible to use an apparatus which is capable of executing both of the recording and reproducing process compliant with the BDAV application standard, and the recording and reproducing process compliant with the BDMV application standard. However, in this case, for example, utilization of the user friendly menu having titles and designs created by using the BDMV function is enabled as regards the data set in the BDMV directory. However, the menu described above cannot be used when reproducing the image set in the BDAV directory, and there is no choice but to use a simple listed data including thumbnail images created by the BDAV function.

In other words, even with the apparatus which is capable of processing both of the BDMV data and the BDAV data, there is a problem in that data access such as a data reproduction command set in the BDMV directory and the BDAV directory cannot be performed using a consolidated menu.

CITATION LIST

Patent Literature

Patent Document 1: JP-A-2007-179671

SUMMARY OF INVENTION

Technical Problem

In view of such circumstances as described above, it is an object of the present invention to provide an information processing apparatus, an information recording medium and an information processing method, and a program configured to record data which is not permitted by BDMV such as 4K×2K images, 1080/60p, or 3D image data, and configured to be capable of using BDMV specific functions such as a menu having various designs and an interactive function which are permitted by a BDMV standard.

Means for Solving the Problem

A first aspect of the present invention is
an information processing apparatus including:
a data processing unit configured to perform a data recording process on a recording medium, wherein
the data processing unit
determines whether or not data-to-be-recorded in the recording medium is standard compliant data compliant with a first application standard,
selects a first directory set in the recording medium for recording the first application standard compliant data as a recording destination on a priority basis when the data-to-be-recorded is the standard compliant data,
selects a second directory different from the first directory as a recording destination when the data-to-be-recorded is standard non-compliant data and performs a data recording process, and
further creates or renews management information to be applied to the reproduction by a virtual file system in which the recorded data in the first and second directories are consolidated and performs a process of recording the created or renewed management information in the recording medium.

In addition, in an embodiment of the information processing apparatus according to the present invention, the data processing unit creates or renews the management information including the management information on all the data-to-be-reproduced recorded in the first directory and the second directory as the management information and records the created or renewed management information in the recording medium.

In addition, in an embodiment of the information processing apparatus according to the present invention, the data processing unit performs a process of creating or renewing the management information including anyone of an index file, a movie object file, a playlist file, and a clip information file to be applied to the reproducing process on the basis of the virtual file system and recording the created or renewed management information in the recording medium.

In addition, in an embodiment of the information processing apparatus according to the present invention, the data processing unit selects the first directory as the recording destination when the data-to-be-recorded is the standard compliant data and is made to be reproducible without applying the virtual file system, and selects the second directory as the recording destination when the data-to-be-recorded is the standard compliant data and is made to be reproducible only when the virtual file system is applied.

In addition, in an embodiment of the information processing apparatus according to the present invention, the data processing unit performs, when recording of the data-to-be-reproduced whose recording destination is a directory different from the first directory is executed, a process of adding an entry including a file name indicating recording destination of the data-to-be-reproduced and a file name on the virtual file system in one-to-one correspondence in a file name conversion table included in the management information.

In addition, in an embodiment of the information processing apparatus according to the present invention, the first application standard is a BDMV standard, the first directory is a BDMV directory, and a second directory is a BDAV directory.

In addition, in an embodiment of the information processing apparatus according to the present invention, the directory for recording the management information is a third directory different from the BDMV directory and the BDAV directory.

In addition, in an embodiment of the information processing apparatus according to the present invention, the first application standard is the BDMV standard, the first directory is the BDMV directory, and the second directory is a directory for recording BDMV standard non-compliant data and the management information.

Furthermore, a second aspect of the present invention is an information processing apparatus including:
a data processing unit configured to perform a data reproducing process from a recording medium, wherein
the data processing unit
copies data-to-be-reproduced set in a directory other than a first directory for recording data compliant with a first application standard set in the recording medium and management information in a local memory, and
constructs a virtual file system in which data in the first directory in the recording medium and the copied data stored in the local memory are consolidated and executes the data reproducing process applied with the virtual file system.

In addition, in an embodiment of the information processing apparatus according to the present invention, the data processing unit performs a reproducing process using the management information included in the copy data stored in the local memory as index information on reproducing data at the time of reproducing process applied with the virtual file system.

In addition, in an embodiment of the information processing apparatus according to the present invention, the data processing unit performs a process of copying the management information including any one of an index file, a movie object file, a playlist file, and a clip information file to be applied to the reproducing process on the basis of the virtual file system to the local memory, and performs the reproducing process applied with any one of the index file, the movie object file, the playlist file, and the clip information file stored in the local memory at the time of reproducing process applied with the virtual file system.

In addition, in an embodiment of the information processing apparatus according to the present invention, the data processing unit references a file name conversion table included in the management information in the local memory, acquires a file name indicating the recording destination of data from file names on the virtual file system to acquire the data-to-be-reproduced when the data-to-be-reproduced is data stored in the local memory when performing the reproducing process applied with the virtual file system.

In addition, in an embodiment of the information processing apparatus according to the present invention, the first application standard is a BDMV standard, the first directory is a BDMV directory, and the data processing unit performs a process of copying the data-to-be-reproduced recorded in a BDAV directory different from the BDMV directory and the management information recorded in a third directory other than the BDMV and BDAV directories to a local memory.

In addition, in an embodiment of the information processing apparatus according to the present invention, the first application standard is the BDMV standard, the first directory is the BDMV directory, and the data processing unit performs a process of copying the data-to-be-reproduced recorded in a second directory different from the BDMV directly and management information to the local memory.

Furthermore, a third aspect of the present invention is an information recording medium including: a first directory configured to record standard compliant data compliant with a first application standard; and a second directory configured to record standard non-compliant data which is not compliant with the first application standard, wherein management information to be applied to reproduction on the basis of a virtual file system in which data recorded in the first and second directories are consolidated is recorded in the second directory or a third directory different from the first and second directories, and the management information is applied in the reproducing apparatus, thereby enabling acquisition and reproduction of the data-to-be-reproduced recorded in the first and second directories.

Furthermore, a fourth aspect of the present invention is an information processing method for executing data recording in a recording medium in an information processing apparatus including:

a step of determining whether or not data-to-be-recorded in the recording medium is standard compliant data compliant with a first application standard by a data processing unit;

a step of selecting a first directory set in the recording medium for recording the first application standard compliant data as a recording destination on a priority basis when the data-to-be-recorded is the standard compliant data, and selecting a second directory different from the first directory as a recording destination to perform a data recording process when the data-to-be-recorded is the standard non-compliant data by the data processing unit, and a step of creating or renewing management information to be applied to the reproduction by the virtual file system in which the recorded data in the first and second directories are consolidated and recording the management information in the recording medium by the data processing unit.

Furthermore, a fifth aspect of the present invention is an information processing method for executing data reproduction from a recording medium in an information processing apparatus including:

a step of copying data-to-be-reproduced set in a directory other than a first directory for recording data compliant with a first application standard set in the recording medium and management information in a local memory by a data processing unit; and a step of constructing a virtual file system in which data in the first directory in the recording medium and the copied data stored in the local memory are consolidated and executing a data reproducing process applied with the virtual file system by the data processing unit.

Furthermore, a sixth embodiment of the present invention is a program that causes an information processing apparatus to execute data recording in a recording medium including:

a step of causing a data processing unit to determine whether or not data-to-be-recorded in the recording medium is standard compliant data compliant with a first application standard;

a step of causing the data processing unit to select a first directory set in the recording media for recording the first application standard compliant data as a recording destination on a priority basis when the data-to-be-recorded is a standard compliant data and select a second directory different from the first directory as the recording destination and perform the data recording process when it is the standard non-compliant data; and a step of causing the data processing unit to create or renew management information to be applied to the reproduction by the virtual file system in which the recorded data in the first and second directories are consolidated and record the management information in the recording medium.

Furthermore, a seventh aspect of the present invention is a program that causes an information processing apparatus to execute data reproduction from a recording medium including:

a step of causing a data processing unit to copy data-to-be-reproduced set in a directory other than a first directory for recording data compliant with a first application standard set in the recording medium and management information in a local memory by a data processing unit; and a step of causing the data processing unit to construct a virtual file system in which data in the first directory in the recording medium and the copied data stored in the local memory are consolidated and execute a data reproducing process applied with the virtual file system by the data processing unit.

The program according to the present invention is a program provided, for example, for an information processing apparatus or a computer system which is capable of executing various program code, for example, by a memory medium. By executing such a program by a program executing unit on the information processing apparatus or the computer system, a process according to the program is realized.

Other objects, characteristics, or advantages of the present invention will be apparent by a detailed description on the basis of embodiment of the present invention or appended drawings described later. In this specification, the term "system" means a configuration of a logical set of a plurality of apparatuses, and is not limited to those having a plurality of apparatuses of various configurations in an identical housing.

Advantageous Effects of Invention

According to an example of the present invention, a plurality of directories are set in a single recording media such as a BD, and a recording destination directory is selected according to data types to perform the recording process. For example, the BDMV standard compliant data is recorded in the BDMV directory, and the BDMV standard non-compliant data, for example, 1080/60p or 3D image data are recorded in the BDAV directory or the BU directory. At the time of data reproducing process, the virtual file system in which the recorded data in the BDMV directory and the recorded data in the BDAV or the BU directory are consolidated is constructed to achieve the reproducing process using the virtual file system. With this configuration, the recording and reproducing of the BDMV standard compliant data and the BDMV standard non-compliant data are achieved in a new system without causing an adverse effect on the existing system.

BRIEF DESCRIPTION OF DRAWINGS

FIG. 3 is an explanatory drawing showing an example of difference between the BDMV standard and the BDAV standard.

FIG. 6 is an explanatory drawing showing an example of a file name conversion table (manifest file (BUMF)).

DESCRIPTION OF EMBODIMENTS

Figure 1:
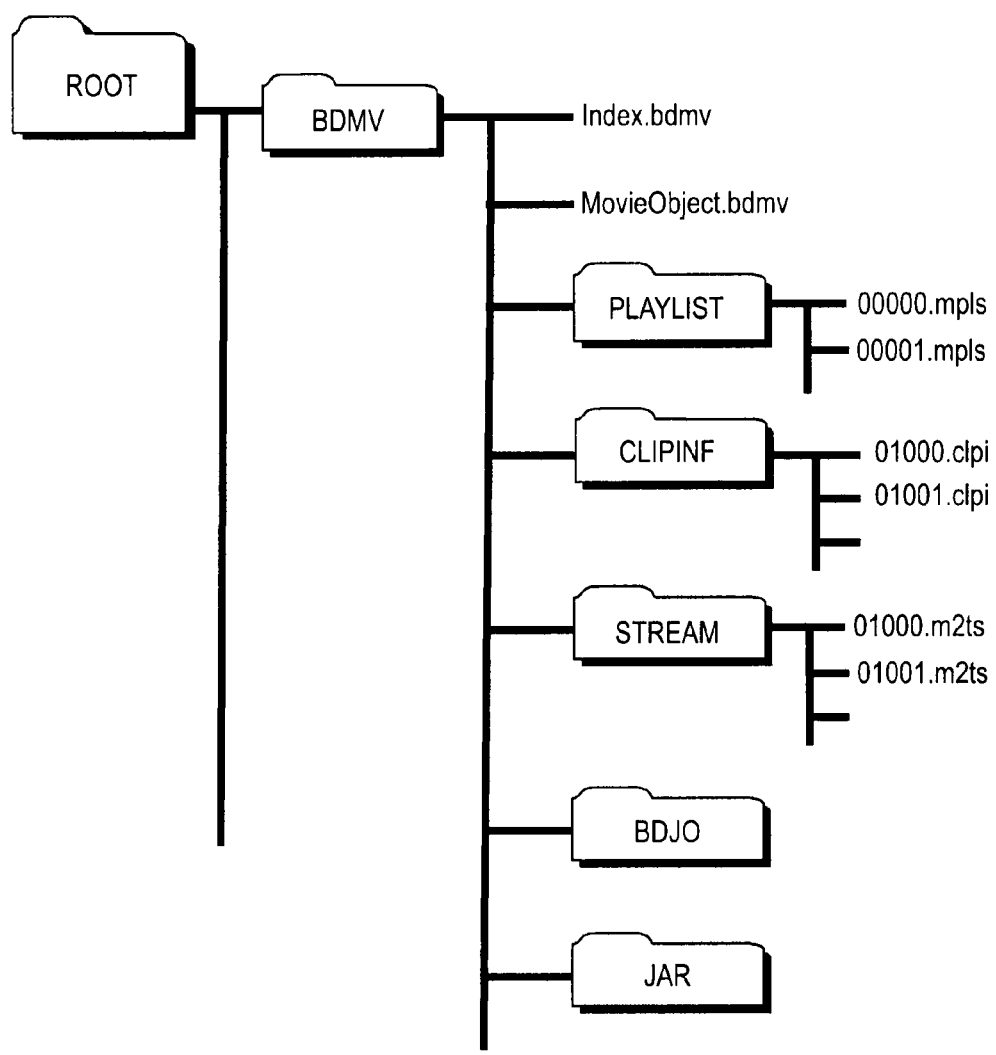
FIG. 1 is a drawing showing a directory configuration as a file management structure of a medium (information recording medium) compliant with a BDMV standard.

Referring now to the drawings, an information processing apparatus, an information recording medium and an information processing method, and a program will be described in detail. The description will be given on the basis of the following items.
1. Outline of BDMV standard and BDAV standard
2. Process using virtual file system (VFS)
2-1. (Example 1) Example in which data recording and reproduction are performed with a BDMV directory and a BDAV directory concurrently provided in a recording medium
2-2. (Example 2) Example in which the data recording and reproduction are performed without setting the BDAV directory in the recording media
3. An Example of Configuration of Information Processing Apparatus

[1. Outline of BDMV Standard and BDAV Standard]

First of all, an outline of existing BDMV standard and BDAV standard will be described. As described above, the BDMV standard and the BDAV standard are designed as application standards for data recording and reproduction using mainly a BD (Blu-ray Disc (Registered Trademark)), but is an application standard which can be applied to the data recording and reproduction using other media such as a flash memory without limiting the recording media to the BD.

The BDMV is an application standard developed for BD-ROMs in which, for example, movie contents or the like are recorded in advance.

The BDAV is an application standard developed for the purpose of being used for BD-REs which are rewritable and BD-Rs which allow recording only once.

A BDMV directory as a data recording configuration recorded in the media compliant with the BDMV standard is shown in FIG. 1. The BDMV standard described below complies with BD-RE 3.0 standard, which is one of standards of the BDMV which permits the data recording process to be performed.

As shown in FIG. 1, in the BDMV standard, when recording data in the media, for example, the moving image stream is coded into MPEG2-TS stream for recording. As shown in FIG. 1, the BDMV directory is placed under a root [Root] directory as directory [BDMV].

Immediately below the directory [BDMV],
an index file [index.bdmv], and
a movie object file [MovieObject.bdmv] are recorded.
In addition, as descendent directories of the BDMV directory [BDMV],
a playlist directory [PLSYLIST],
a clip information directory [CLIPINF],
a stream directory [STREAM],
a BDJO directory [BDJO], and
a JAR directory [JAR] are set.

Playlist files [xxxxx.mpls] are set in the playlist directory [PLAYLIST], clip information files [xxxxx.clpi] are set in the clip information directory [CLIPINF], and clip AV stream files [xxxxx.m2ts] are set in the stream directory [STREAM].

The index file, the movie object file, and the playlist file are management information files applied to reproduction of data stored in the clip AV stream file. These management information files are referred to as data base files, or data base. Detailed description of the respective files will be given below.

The index file [index.bdmv] is a management information file for the recording data of the entire media. For example, indices (information on the relation of correspondence between titles and movie objects) are recorded for the respective titles set as units of the recording data. When the medium (information recording medium) is loaded on a recording and reproducing apparatus, the index file is read first, so that a user can view the titles described in the index file and specify the reproduction thereof.

The movie object file [MovieObject.bdmv] is a file in which the management information on the playlists is stored. A plurality of programs for executing a reproducing process using the various playlists are included. A program to be applied to an AV stream reproducing process and, for example, a program to be applied to a menu display process are also included.

The playlist files [xxxxx.mpls] recorded in the playlist directory [PLAYLIST] are provided corresponding to the titles displayed to the user, and are reproduction lists each including at least one play item. Each play item is a reproduction segment specifying information having a reproduction start point (IN-point) and a reproduction end point (OUT-point) for the clip. By arranging a plurality of the play items in the playlist, on a time axis, the order of reproduction of the respective reproduction segments can be specified.

The clip information files [xxxxx.clpi] recorded in the clip information directory [CLIPINF] are set corresponding to the AV stream files [xxxxx.m2ts] recorded in the stream directory [STREAM]. The clip information files are files in which information on a stream required when reproducing the actual stream is written.

The AV stream files [xxxxx.m2ts] recorded in the stream directory [STREAM] are files in which the streams recorded in MPEG2-TS format are stored. The image data is stored in these files.

In the BDJO directory [BDJO] and the JAR directory [JAR], for example, various data processing programs, functions, and so on applied with Java (registered trademark) are stored. For example, a program for setting the virtual file system used in the data reproducing process, a program to be applied to menu creating and menu displaying processes, and a program for realizing an interactive function at the time of data recording and reproduction are included.

For reference sake, in the BDMV directory, for example, directories for recording back up data and AACS related data files such as copyright management information are set in addition to the directories and files shown in FIG. 1.

For reference sake, in the following description, the files in which the data-to-be-reproduced are stored such as the AV stream file are collectively referred to as "stream files" for brevity. Also, the index file, the movie object file, the playlist file, and the clip information file are collectively referred to as management information or data base.

Figure 2:
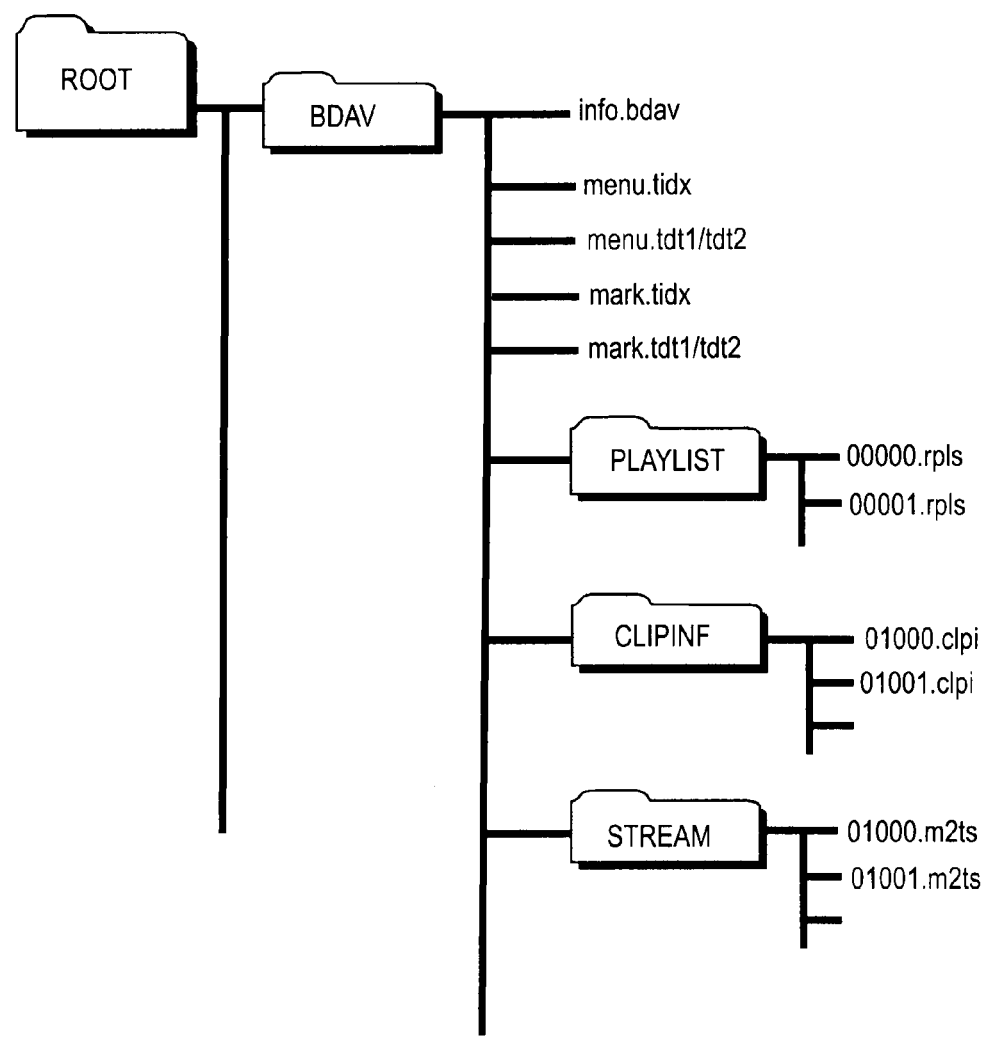
FIG. 2 is a drawing showing a directory configuration as a file management structure of a medium (information recording medium) compliant with a BDAV standard.

Referring now to FIG. 2, the BDAV directory as a data recording configuration recorded in the media compliant with the BDAV standard will be described. The BDAV standard described below complies with BD-RE2.1 standard, which is one of standards of the BDAV. As shown in FIG. 2, the BDAV directory is placed under the root [Root] directory as directory [BDAV].

Immediately below the directory [BDAV],
an info file [info.bdav],
menu files [menu.tidx], [menu.tdt1/tdt2], and
mark files [mark.tidx], [mark.tdt1/tdt2] are recorded.

In addition, as descendent directories of the BDAV directory [BDAV],
the playlist directory [PLSYLIST]
the clip information directory [CLIPINF], and
the stream directory [STREAM] are set.

The playlist files [xxxxx.mpls] are set in the playlist directory [PLAYLIST], the clip information files [xxxxx.clpi] are set in the clip information directory [CLIPINF], and the AV stream files [xxxxx.m2ts] are set in the stream directory [STREAM].

The info file [info.bdav] is a file in which the management information on the entire BDAV directory is stored.

In the menu files [menu.tidx], [menu.tdt1/tdt2], thumbnail images of representative images of the respective AV stream files are stored. The [menu.tidx] stores thumbnail management information, and the [menu.tdt1/tdt2] stores thumbnail images.

Unlike the BDMV standard, the BDAV standard does not provide a function to create a menu having various information, and is set to provide a simple menu display which displays leading images of videos shot by the user in the form of thumbnails. The menu files [menu.tidx], [menu.tdt1/tdt2] manage and store the thumbnail images therefor.

The mark files [mark.tidx], [mark.tdt1/tdt2] are files in which the thumbnail images corresponding to marked positions which are index information set in an editing process on the images shot by the user (AV stream file) are managed and stored. The [mark.tidx] stores the thumbnail management information and [mark.tdt1/tdt2] stores thumbnail images.

The playlist directory [PLAYLIST], the clip information directory [CLIPINF], and the stream directory [STREAM] are set in substantially similar to the BDMV directory described with reference to FIG. 1 above.

The playlist files [xxxxx.rpls] are recorded in the play dist directory [PLAYLIST].

The clip information files are recorded in the clip information directory [CLIPINF], and the AV stream files [xxxxx.m2ts] recorded in MPEG2-TS format for example, are recorded in the stream directory [STREAM].

As described thus far with reference to FIG. 1 and FIG. 2, the BDMV directory and the BDAV directory have similar configuration, but the BDMV application standard and the BDAV application standard are different in data format which permits recording and reproducing. Also, there is a significant difference in menu creating functions and interactive functions.

The difference between the BDMV application standard and the BDAV application standard will be described with reference to a table shown in FIG. 3.

(a) Recording and Reproducing Permitted Data

The BDMV application standard is strict in restriction on the data formats which can be recorded and reproduced. For example, in the case of the BDMV application standard, recording and reproduction of the [1080/60p image], which is a HD (High Definition) image having 1920×1080 pixels in a progressive system or 3D images as three-dimensional images, or 4K×2K images having approximately 4000×2000 pixels are not permitted.

Examples of the image data formats which are permitted as the recording and reproducing data in the BDMV application standard includes, for example, [1080/60i].

The [1080/60i] indicates that HD (High Definition) images having 1920×1080 pixels are recorded and reproduced on the basis of 1080 lines as 60 field images per second using an interlace system.

In contrast, the BDAV application standard is not strict in restriction on the data formats which can be recorded and reproduced. For example, recording and reproducing of 1080/60p images, 3D images, and 4K×2K images are permitted.

(b) Menu Display Function

According to the BDMV application standard, a high-performance menu which allows, for example, free title setting and has various designs can be created and used by using a program included in the movie object file [MovieObject.bdmv] or Java (registered trademark) stored in BDJO and JAR directories described above with reference to FIG. 1.

The menu screen provided in the BDAV application standard is only the display of the thumbnail images using [menu.tidx], [menu.tdt1/tdt2] described above with reference to FIG. 2.

(c) Interactive Function

According to the BDMV application standard, display and usage of buttons for various operations are possible using the Java (registered trademark) programs stored in the BDJO, JAR directories described above with reference to FIG. 1, and an advanced interactive function can be provided.

In the BDAV application standard, only stop of reproduction of the content can be executed, and the advanced interactive function cannot be provided.

In the following description, the apparatuses executing the recording and reproducing process compliant with the BDMV application standard are referred to as a BDMV player, or a BDMV recorder, or a BDMV (recording and reproducing) apparatus. Also, the apparatuses executing the recording and reproducing process compliant with the BDAV application standard are referred to as a BDAV player, or a BDMV recorder, or a BDAV (recording and reproducing) apparatus.

The BDMV apparatus sets the BDMV directory shown in FIG. 1 as a medium (recording medium) to execute the data recording and reproducing process, and the BDAV apparatus sets the BDAV directory shown in FIG. 2 as a medium (recording medium) to execute the data recording and reproduction.

However, many of the apparatuses which perform the recording and reproducing process compliant with the BDAV application standard are capable of executing a reproducing process function compliant with the BDMV application standard.

These apparatuses are capable of performing processes using the BDAV application for the recording and reproducing process using the recordable media such as BD-REs or BD-Rs, and using the BDMV application when reproducing the BD-ROMs in which the movie or the like is already recorded.

Therefore, the BDAV player, or the BDAV recorder, or the BDAV (recording and reproducing) apparatus will be described as apparatus which are capable of executing both of the recording and reproducing process compliant with the BDAV application standard and the recording and reproducing process compliant with the BDMV application standard.

The BDMV application standard and the BDAV application standard are standards designed by the BDA (Blu-ray Disc Association) as described above. For example, materials are disclosed in [http://www.blu-raydisc.com/].

As described with reference to FIG. 3, when the BDMV apparatus which executes the recording and reproducing process compliant with the BDMV standard is used, recording of 1080/60p images, 3D images, and 4K×2K images cannot be achieved. For example, even when the 1080/60p images, the 3D images, the 4K×2K images and the like are shot with a video camera compliant with the BDMV standard, these images cannot be recorded. If the BDAV standard is complied with, recording is possible. However, there is a problem in that the high-performance menu or the interactive function cannot be used.

As described above, it is possible to use the apparatus which can execute both of the recording and reproducing process compliant with the BDAV application standard and the recording and reproducing process compliant with the BDMV application standard. However, even when the apparatus described above is used, although utilization of the high-performance menu according to the BDMV function is possible for the data set in the BDMV directory, this menu cannot be used for reproducing the data set in the BDAV directly and hence there is no choice but using the thumbnails created by the BDAV function.

In other words, even with the apparatus which is capable of processing both of the BDMV data and the BDAV data, there is a problem in that data access such as a data reproduction command set in the BDMV directory and the BDAV directory cannot be performed using consolidated menu.

A configuration which solves these problems will be described below. In other words, it is a configuration which allows recording and reproducing of the BDMV standard non-compliant data such as 1080/60p images, 3D images, 4K×2K images and the like which are not permitted to be recorded and reproduced in the BDMV standard and, simultaneously, allows access to both of the BDMV standard compliant data and the BDMV standard non-compliant data from one menu.

In the configuration according to the present invention described below, both of the BDMV standard compliant data and the BDMV standard non-compliant data can be accessed and reproduced from one menu in the BDMV apparatus of the related art without causing any problem in reproduction compatibility and, in the apparatuses which are capable of reproducing the BDMV standard non-compliant data, by using the expanded reproduction mechanism of the BDMV. In addition, in Example 1 described below, although the reproduction by expanding the BDMV reproduction mechanism cannot be achieved, the decoding function of the expanded stream, which is the BDMV standard non-compliant data is provided, while in the apparatuses having the BDAV reproducing mechanism, direct reproduction is also possible by using the BDAV reproducing mechanism.

[2. Process using Virtual File System (VFS)]

The following is a description of a configuration in which data which is not permitted to be recorded and reproduced in the BDMV standard is recorded in a directory other than the BDMV directory, and a virtual file system (VFS) is constructed at the time of reproduction, and reproduction is achieved by using the BDVM reproducing mechanism.

The following two examples are described below. (Example 1) Example in which data recording and reproduction are performed with the BDMV directory and the BDAV directory concurrently provided in the recording media (Example 2) Example in which data recording and reproduction are performed without setting the BDAV directory in the recording media These examples will be described in sequence below.

2-1. Example 1

Example in which Data Recording and Reproduction are Performed with the BDMV Directory and the BDAV Directory Concurrently Provided in the Recording Media First of all, an example in which data recording and reproduction are performed with the BDMV directory and the BDAV directory concurrently provided in the recording medium will be described as Example 1.

Figure 4:
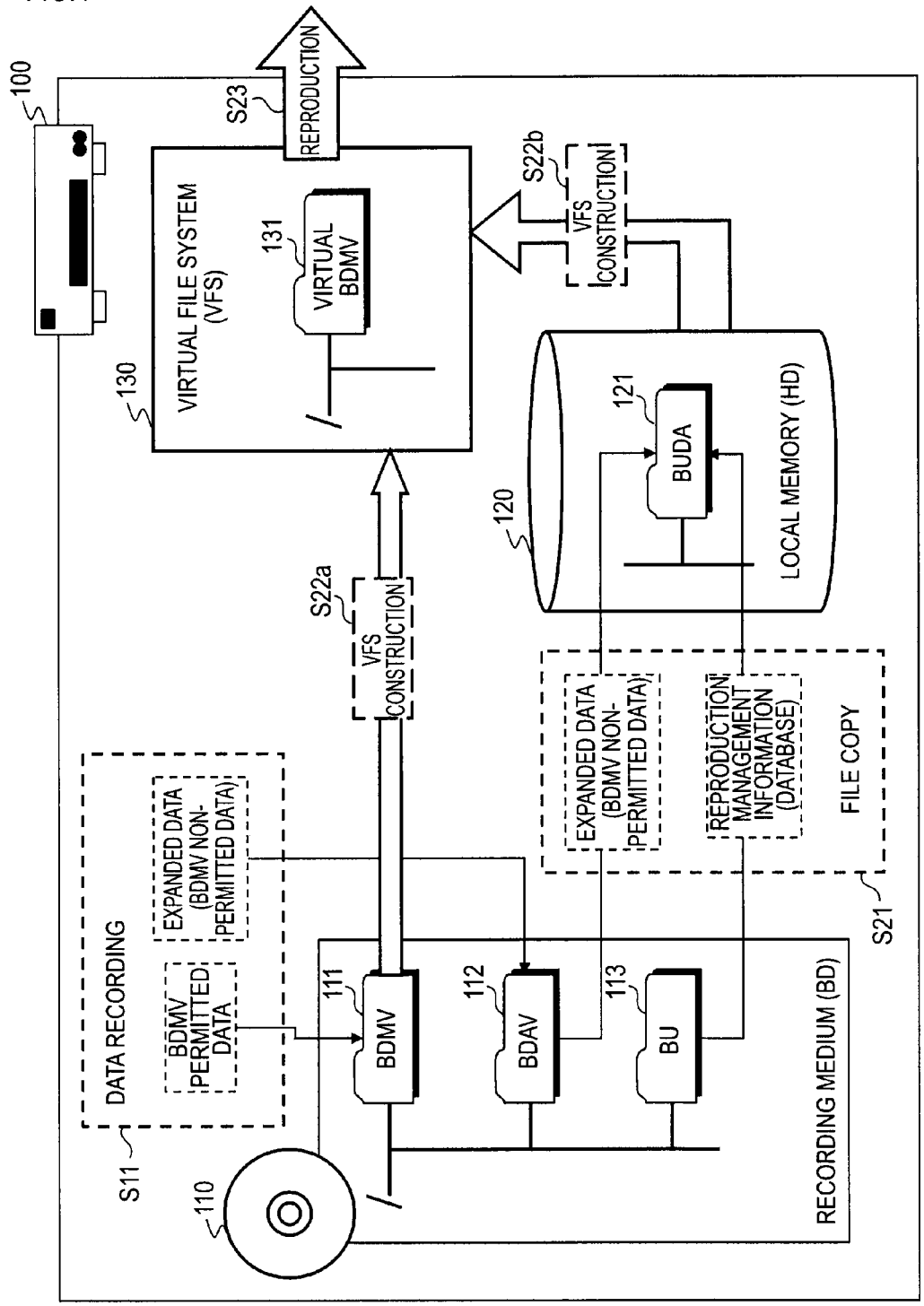
FIG. 4 is an explanatory drawing showing an outline of a data recording and reproducing process according to a first embodiment of the present invention.

Referring now to FIG. 4, an outline of the data recording and reproducing process by an information processing apparatus according to Example 1.

An information processing apparatus 100 shown in FIG. 4, having a medium (information recording medium) 110 loaded thereon, executes data recording and reproducing process. In this example, the medium 110 is, for example, a data recordable BD (Blu-ray Disc (registered trademark)). For reference sake, the medium 110 is not limited to the BD, but may be other media such as a flash memory.

The information processing apparatus 100 further includes a local memory 120 made up of a hard disk or the like, for example.

First of all, a data recording process for the medium 110 by the information processing apparatus 100 will be described. The medium 110 is assumed to be a data recordable medium, for example, a BD-RE, or a BD-R. When performing only the reproducing process, a medium which is not rewritable, for example, a BD-ROM, may be used.

The information processing apparatus 100 sets
a BDMV directory 111,
a BDAV directory 112, and
a BU directory 113
in the medium 110 as shown in the drawing. This process is executed by a program held by the information processing apparatus in the memory of the apparatus.

The BDMV directory 111 is a directory having a similar configuration to that described above with reference to FIG. 1, and the BDAV directory 112 is a directory having a similar configuration to that described above with reference to FIG. 2.

The BU directory 113 is a binding unit directory, and is a directory for recording management information required when constructing the virtual file system (VFS) described later.

A process to be performed when the information processing apparatus 100 executes data recording on the medium 110 is shown in Step S11.

As shown in Step S11, when the data-to-be-recorded is a BDMV standard compliant data, the recording process is performed in the BDMV directory 111. Also, when recording data having formats other than the BDMV standard, for example, the BDMV standard non-compliant data such as 1080/60p images, 3D images, and 4K×2K images as described above, a process of recording in the BDAV directory 112 is executed. In the following description, the BDMV standard non-compliant data such as 1080/60p images, 3D images, and 4K×2K images is referred to as expanded data.

However, even when the BDMV standard compliant data, it can be recorded in the BDAV directory. Detailed recording process sequence will be described later with reference to a flowchart.

For the reference sake, at the time of data recording process, creation or renewal and recording process are performed not only on the AV stream file, but also on the clip information file and the playlist file. In addition, a renewal process on the database files such as the movie object file and the index file on an as-needed basis is performed.

When the data recording process is executed, the management information on the BU directory 113 is renewed. This process is a management information renewal process required when constructing the virtual file system (VFS) described later. Detailed description about these processes will be given later.

In this manner, the information processing apparatus 100 in this example executes the process of recording basically in the BDMV directory 111 for the BDMV standard compliant data, and executes the process of recording in the BDAV directory 112 for the expanded data (BDMV standard non-compliant data).

Subsequently, an outline of the data reproducing process will be described. The information processing apparatus 100 of the present invention is capable of specifying both of the data recorded in the BDMV directory and the data set in the BDAV directory from one menu for the reproducing process. This menu is a menu created by the BDMV standard.

Both of the data recorded in the BDMV directory and the data set in the BDAV directory can be reproduced using the interactive function which is available in the BDMV standard.

The menu display or the interactive function are functions provided by the movie object file [MovieObject.bdmv], the BDJO directory [BDJO], or, for example, Java (registered trademark) recorded in the JAR directory [JAR] in the BDMV directory described above with reference to FIG. 1.

In the related art, these programs could not be used for the data recorded in the BDAV directory. However, by using the virtual file system (VFS) set in the configuration of the present invention, the BDMV standard compliant menu function or the interactive function can be used also for the data recorded in the BDAV directory.

At the time of reproducing process, as shown in Step S21 shown in FIG. 4, a process of copying the expansion data (BDMV standard non-compliant data) file (AV stream file) recorded in the BDAV directory 112 and the management information file recorded in the BU directory 113 or the like in the local memory 120 is performed as a first step. The result of copying is a BUDA 121 in the local memory 120 shown in the drawing. The BUDA means a binding unit data area.

Subsequently, in Step S22 (S22a, S22b), a binding process is performed on the respective data in the BDMV directory 111 and following directories recorded in the medium 110 and the BUDA 121 in the local memory to construct a virtual file system (VFS) 130.

In Step S23, the reproducing process using the constructed virtual file system (VFS) 130 is performed.

The virtual file system (VFS) 130 is a virtual file system used by a reproduction application executed by the information processing apparatus 100. The virtual file system (VFS) 130 includes a virtual BDMV directory 131 as a virtual data package.

Both of the BDMV standard compliant data recorded in the medium 110 and the expanded data (BDMV standard non-compliant data) copied in the local memory 120 are included in the virtual BDMV directory 131 of the virtual file system (VFS) 130. At the time of reproducing process, the both can be specified from one menu for reproduction. The menu can be created according to the menu creating program compliant with the BDMV standard.

The data set in the virtual BDMV directory 131 of the virtual file system (VFS) 130 is actually the data recorded in the medium 110 and a separate recording medium in the local memory 120. The reproduction application of the information processing apparatus 100 is capable of performing the reproducing process as if the virtual BDMV directory 131 of the virtual file system 130 is a directory set in a certain single media.

Figure 5:
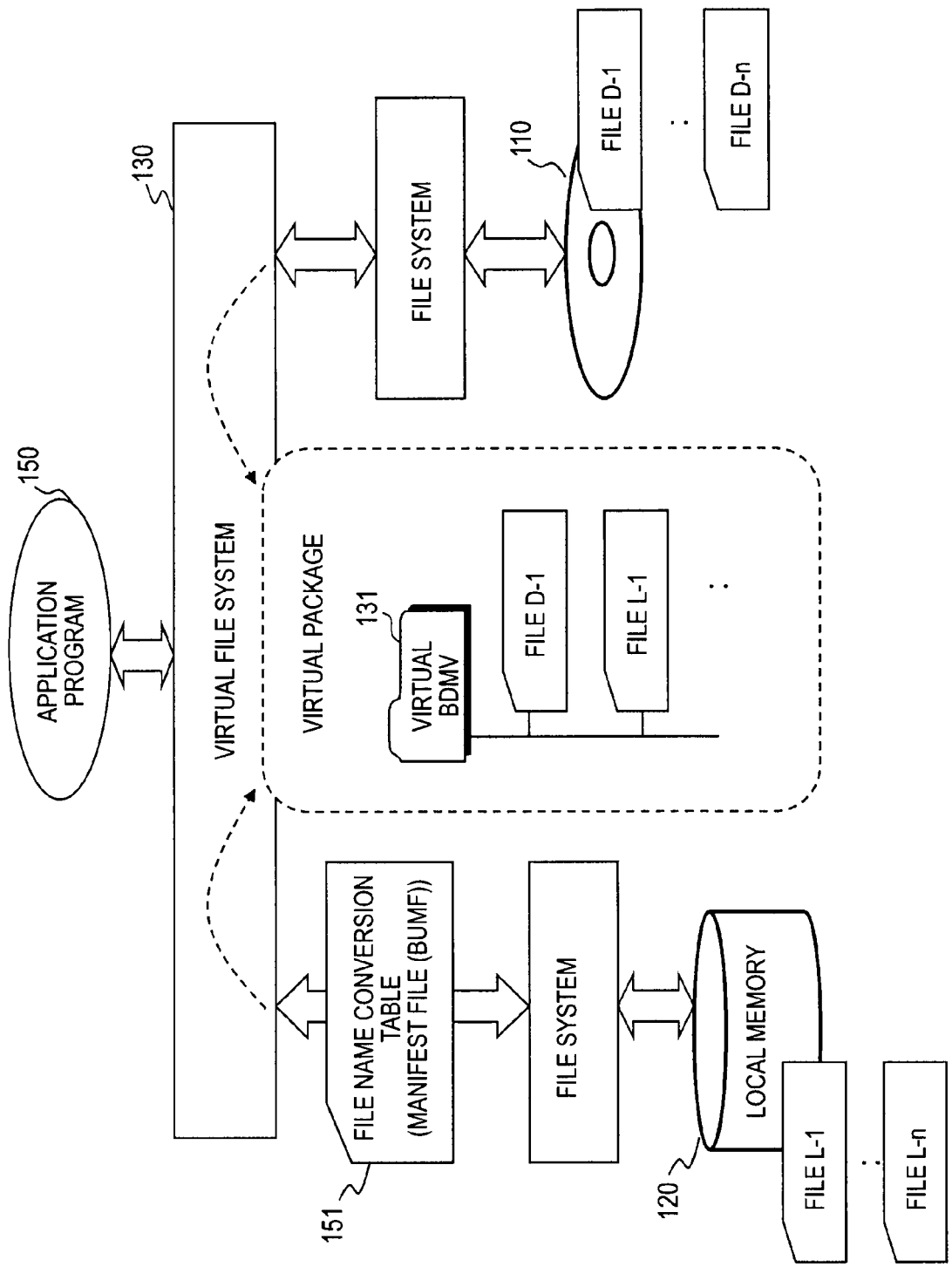
FIG. 5 is an explanatory drawing showing a virtual file system (VFS).

The information processing apparatus 100 which executes the content reproducing process performs a file name conversion process on the data stored in the local memory 120 when performing the reproducing process using the virtual file system (VFS) 130. The table applied to the conversion process is a file name conversion table (manifest file (BUMF)). Referring now to FIG. 5 and FIG. 6, an outline of the content reproducing process using the VFS and the file name conversion table (BUMF) will be described.

Referring to FIG. 5, creation of the virtual file system (VFS) 130 by consolidating contents stored in the medium 110 and the data stored in the local memory 120 such as the hard disk, and the reproducing process will be described.

The application program 150 shown in FIG. 5 is an expanded reproduction application executed by the information processing apparatus 100 in the present invention. The application program 150 operates the files recorded in the medium 110 or the files recorded in the local memory 120 via the virtual file system (VFS) 130.

The virtual file system 130 performs a role of shielding the difference between recording media (file systems) with respect to the application program 150. The application program 150 is capable of operating the files recorded in the respective recording media by using the same API without regard to the difference of the recording media in which the files are recorded.

The virtual file system (VFS) 130 is created by merging the file system in the medium 110 and the file system in the local memory 120 when the medium 110 is loaded on the apparatus or at the time of execution of the application program, and the created virtual file system (VFS) 130 is stored in the memory of the information processing apparatus 100. In this case, the virtual file system (VFS) is renewed every time when the directories or the files recorded in the local memory 120 are changed by writing of files.

The application program 150 accesses data for performing the reproducing process assuming that the data in the BDMV directory 111 of the medium 110 shown in FIG. 4 and the respective data in the BUDA 121 copied to the local memory 120 are set in the virtual BDMV directory 131 of the virtual file system (VFS) 130.

The application program 150 performs a process similar to a process to be performed by using the BDMV directory 111 of the medium 110. In this case, there is no problem in the process using the data recorded in the BDMV directory 111 of the medium 110. However, when an attempt is made to access the data recorded in the local memory 120, since the data is not in the BDMV directory 111 of the medium 110 but actually in the local memory 120, access cannot be achieved.

In order to solve the problem, a file name conversion table (manifest file (BUMF)) 151 is used. The file name conversion table 151 is a table having data including destination file names (dst_file_name) as virtual file names in the virtual BDMV directory 131 and source file names (src_file_name) indicating the actual recording destination, that is, the recording destinations (passes) in the local memory 120 in one-to-one correspondence.

The file name conversion table 151 is referred to as a manifest file (BUMF). The file name conversion table (manifest file (BUMF)) 151 is recorded in the BU directory 113 shown in FIG. 4. When the data recording is executed on the BDAV directory 112 at the time of execution of the recording process, a data processing unit in the information processing apparatus performs a process of setting an entry corresponding to the recorded data to the filename conversion table (manifest file (BUMF)) 151.

An example of configuration of the file name conversion table (manifest file (BUMF)) is shown in FIG. 6. As shown in FIG. 6, the file name conversion table (manifest file (BUMF)) is set as data including the source file names (src_file_name) indicating the recording destinations (passes) in the local memory 120 and the destination file names (dst_file_name) as the virtual file names in the virtual BDMV directory 131 in one-to-one correspondence.

The destination file names (dst_file_name) are file names on the virtual BDMV 131, and the application program 150 shown in FIG. 5 performs file access on the basis of the destination file names (dst_file_name). When the destination file names (dst_file_name) are registered in the file name conversion table (manifest file (BUMF)) shown in FIG. 6, the source file name (src_file_name) corresponding to the destination file name (dst_file_name) is acquired and data is acquired from the local memory 120 on the basis of the source file names (src_file_name).

The file name conversion table (BUMF) 151 is set in the BU directory 113 of the medium 110 shown in FIG. 4. The entry recording process with respect to the file name conversion table (BUMF) 151 is performed when the data recording in the BDAV directory 112 shown in FIG. 4 is executed.

The destination file names (dst_file_name) are set so as not to overlap with the file names in the AV stream file set in the BDMV directory 111. However, since the index file [index.bdmv] or the movie object file [MovieObject.bdmv] is used instead of the files in the BDMV directory 111 when using the virtual file system (VFS), the file names identical to the file names set in the BDMV directory 111 are recorded as the destination file names (dst_file_name).

The source file names (src_file_name) are set as pass information indicating the relative position of storage in the BUDA 121 directory and following directories. The data recorded in the BU directory 113 is recorded in the local memory 120 as the BUDA 121 shown in FIG. 4 without changing the relative recording position.

In the reproducing process using the virtual file system (VFS), the application program 150 first of all specifies an intended file name as the destination file name (dst_file_name), and acquires a source file name (src_file_name) recorded corresponding to the destination file name (dst_file_name) specified from the file name conversion table (BUMF) 151. Subsequently, the intended file can be acquired from the BUDA area in the local memory 120 using the acquired source file name (src_file_name).

Figure 7:
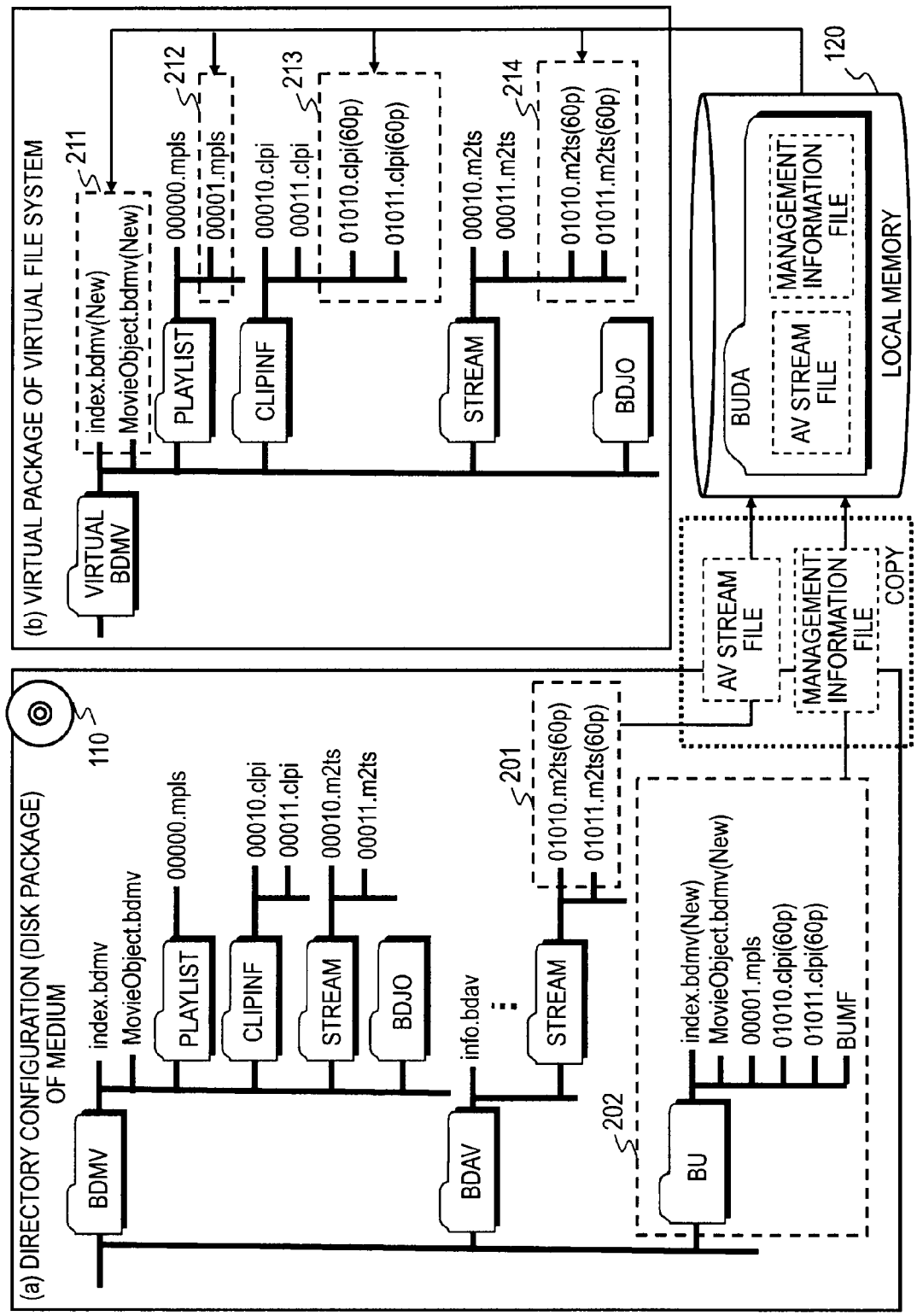
FIG. 7 is an explanatory drawing showing directories to be set in the data recording and reproducing process, the virtual file system, and an example of data arrangement according to the first embodiment of the present invention.

Referring now to FIG. 7, examples of detailed recording of data and a setting process for the virtual file system (VFS) in this example will be described. In FIG. 7, (*a*) Directory Configuration (disk package) of Medium (*b*) Virtual Package of Virtual File System (VFS), and in addition, an example of the data recorded in the BUDA of the local memory 120 are shown.

(a) The directory configuration (disk package) of the medium is a configuration including the BDMV directory, the BDAV directory, and the BU directory as described above.

In the BDMV directory, data compliant with the BDMV standard and the management information on the data are recorded.

In the BDAV directory, a BDMV standard non-compliant extended data and the management information on the expanded data is recorded.

In the BU directory, the management information file used when constructing the virtual file system (VFS) and the file name conversion table (manifest file (BUMF)) described above are recorded.

At the time of construction of the virtual file system, a stream file 201 recorded in the BDAV directory and data 202 recorded in the BU directory are copied in the local memory 120.

The data copied to the local memory 120 is stored in the local memory as the BUDA 121, then the BUDA 121 and data in the BDMV directory in (a) the directory configuration (disk package) of medium are consolidated, so that (b) the virtual package in the virtual file system (VFS) is set.

Data set in the virtual BDMV will be described.

The file shown in FIG. 7(*b*) as a management information file 211;

an index file [index.bdmv (New)] and a movie object file [MovieObject.bdmv (New)] are originally the data 202 recorded in the BU directory and is data in the BUDA 121 in the local memory 120.

Although the index file [index.bdmv], and the movie object file [MovieObject.bdmv] are set also in the BDMV directory in (a) the directory configuration (disk package) of the medium, when using the virtual file system, the index file

[index.bdmv], and the movie object file [MovieObject.bdmv] in the data 202 recorded in the BU directory are used.

The index file [index.bdmv], and the movie object file [MovieObject.bdmv] set in the BDMV directory in (a) the directory configuration (disk package) of the medium include only management information set in the BDMV directory in the medium.

However, the index file [index.bdmv], and a movie object file [MovieObject.bdmv] of the data 202 recorded in the BU directory are set as data including the management information not only on the data recorded in the BDMV directory in the medium, but also on the expanded data recorded in the BDAV directory.

In the reproducing process using the virtual file system, the reproducing process is performed not only on the data recorded in the BDMV direction in the medium, but also on the expanded data recorded in the BDAV directory, the index file [index.bdmv], and the movie object file [MovieObject.bdmv] in the data 202 recorded in the BU directory are set as a management information file 211 of the virtual BDMV.

In addition, the following files shown in (b) the virtual package of the virtual file system (VFS), that is, a playlist file [00001.mpls] 212,
a clip information file [01010/clip] (60p) 213,
the clip information file [01011/clip] (60p) 213,
an AV stream file [01010/m2ts] (60p) 214, and
the AV stream file [01011/m2ts] (60p) 214, are data of the BUDA 121 of the local memory 120.

The (60p) indicates that the data is the [1080/60p] image data of the progressive system, for example. In other words, it indicates that the data is the BDMV standard non-compliant data. As described above, 3D images, 4K×2K images and the like are also the BDMV standard non-compliant data, and these data are processed in the same manner.

The files 211 to 214 shown in (b) the virtual package of the virtual file system (VFS) in FIG. 7 are acquired from the local memory 120 with reference to the file name conversion table (manifest file (BUMF)) described above with reference to FIG. 6. Other data are acquired from the BDMV directory in the medium 110.

The file name conversion table (manifest file (BUMF)) is copied in the local memory 120 as part of the data 202 recorded in the BU directory and the application for executing the reproducing process is used by reading out the file name conversion table (manifest file (BUMF)) recorded in the local memory 120.

As shown in (b) in FIG. 7, the BDJO, JAR directories set in the BDMV directory are included in the virtual file system. Therefore, at the time of reproducing process using the virtual file system, Java (registered trademark) program stored in the BDJO, JAR directories can be used. By using the Java (registered trademark) program, a menu display having various designs is achieved. Also by using the Java (registered trademark) program stored in the BDJO, JAR directories, for example, various control buttons can be displayed for achieving the reproducing process using the interactive function.

For reference sake, in the example shown in FIG. 7, the data 202 in the BU directory is set to include the playlist file, the clip information file corresponding to the AV stream file recorded in the BDAV directory. These files are recorded also in the BDAV directory.

According to the setting of this example, only the AV stream file is copied from the BDAV directory in the media 110, and other data are copied from the BU directory at the time of constructing the virtual file system (VFS). Therefore, the playlist file, the clip information file corresponding to the stream file recorded in the BDAV directory are also recorded in the BU directory.

However, for example, such setting that the playlist file and the clip information file corresponding to the stream file recorded in the BDAV directory are read from the BDAV directory in the medium 110, and are recorded in the local memory 120 after having converted into a playlist file and a clip information file compliant with the BDMV standard is also possible. In this setting, it is not necessary to record these files in the BU directory.

Figure 8:
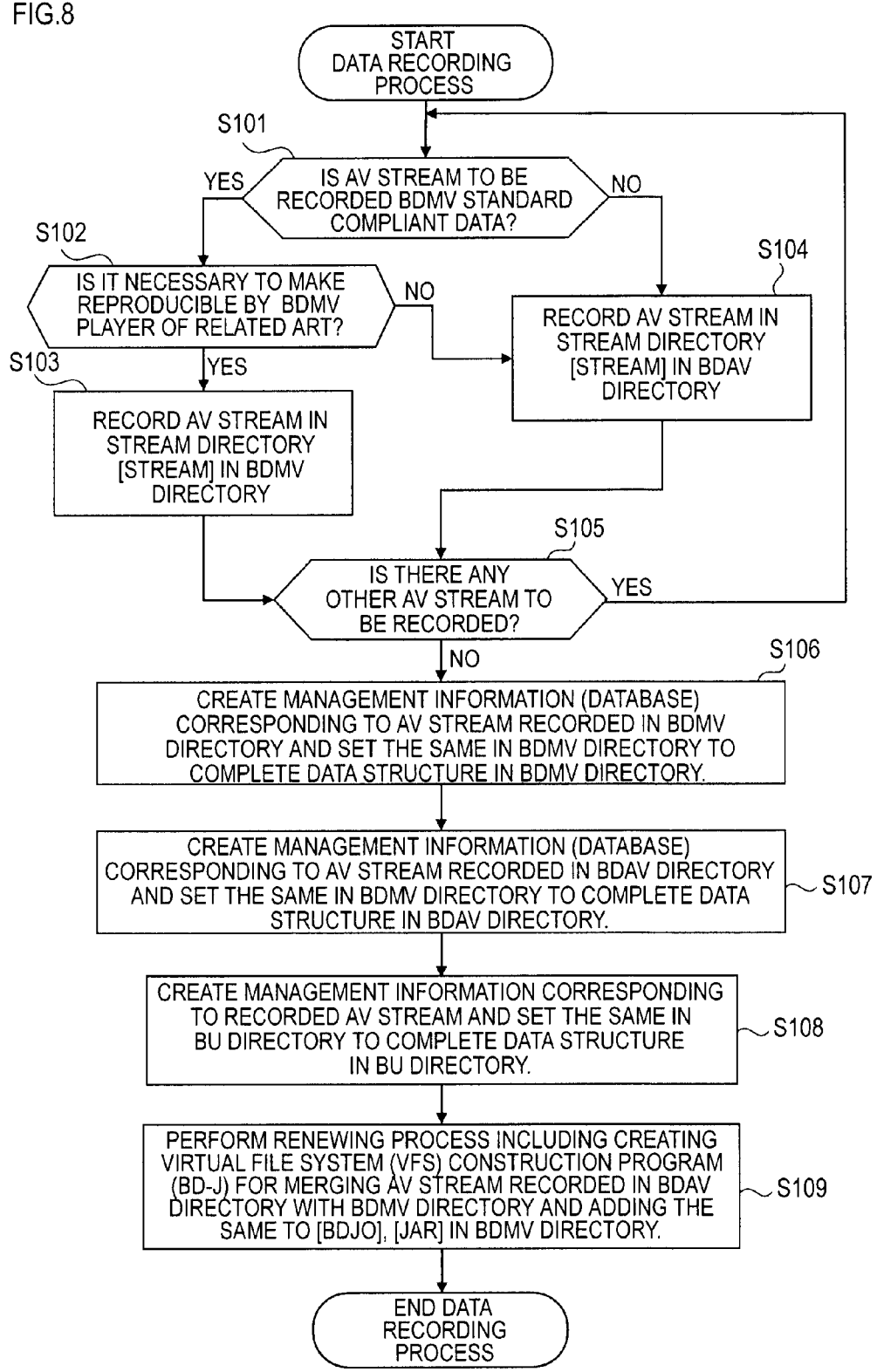
FIG. 8 is a drawing showing a flowchart for explaining a sequence of the data recording process according to the first embodiment of the present invention.
Figure 9:
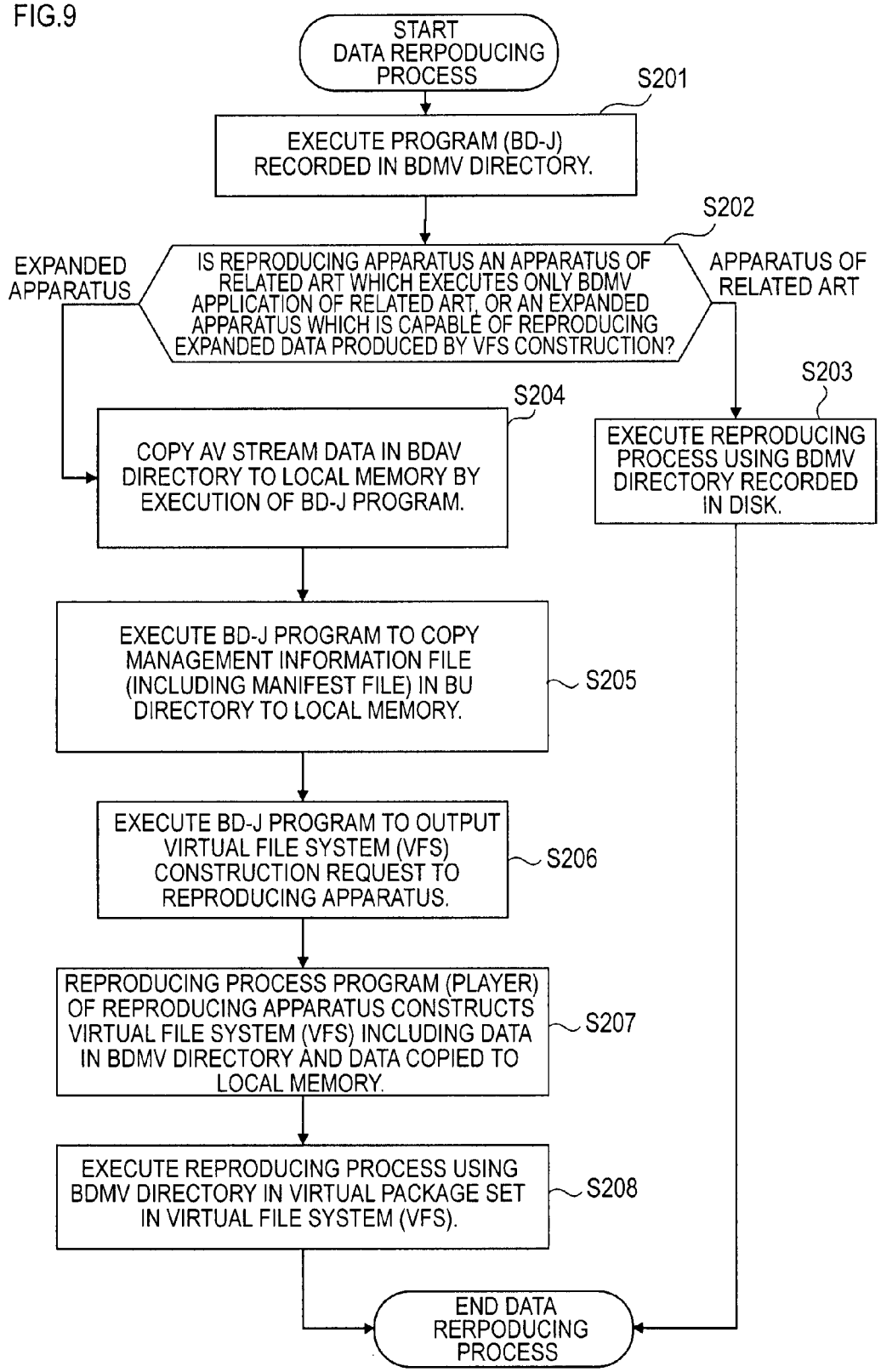
FIG. 9 is a drawing showing a flowchart for explaining a sequence of the data reproducing process according to the first embodiment of the present invention.

Referring now to flowcharts shown in FIG. 8 and FIG. 9, a data recording process sequence and a data reproducing process according to this example will be described.

Referring first to the flowchart shown in FIG. 8, the data recording process sequence in this example will be described.

The data recording process is executed by the data processing unit in the information processing apparatus. The data processing unit includes a CPU having an application program executing function. The processes in the respective steps of the flowchart shown in FIG. 8 will be described.

In Step S101, the AV stream to be recorded is whether or not the BDMV standard compliant data is determined. As described above, for example, in the case of the BDMV application standard, recording and reproducing of the [1080/60p image] or 3D images as three-dimensional images, or 4K×2K images having approximately 4000×2000 pixels are not permitted. When recording these data, the determination in Step S101 is No.

For example, if the AV stream to be recorded is the BDMV standard compliant data such as [1080/60i image], the determination in Step S101 is Yes, and the procedure goes to Step S102.

In Step S102, whether or not it is necessary to make the BDMV standard compliant data reproducible by using the BDMV player of the related art is determined. This determination may be performed by the user, or may be automatically determined by setting in advance to either of those. The determining process in Step S102 is a determination step for permitting even the BDMV standard data-to-be-recorded in the BDAV directory. In a case where all the BDMV standard compliant data are set to be recorded in the BDMV directory, the determining process in the Step S102 may be omitted.

If the result of determination in Step S102 is Yes, the procedure goes to Step S103, and the AV stream is recorded in the stream directory [STREAM] in the BDMV directory.

In contrast, if the result of determination in Step S101 is No, that is, if the data-to-be-recorded is an expanded data which is not the BDMV standard compliant data, and if the result of determination in Step S102 is No, that is, the data-to-be-recorded is a BDMV standard compliant data is to be recorded in the BDAV directory, the procedure goes to Step S104.

In Step S104, the AV stream is recorded in the stream directory [STREAM] in the BDAV directory.

In this manner, the information processing apparatus in this example determines whether or not the data-to-be-recorded in the recording media is the standard compliant data compliant to the BDMV standard and, if it is the BDMV standard compliant data, selects the BDMV directory to record the BDMV standard compliant data set in the recording media as the recording destination on a priority basis and, when the data-to-be-recorded is the expanded data (BDMV standard non-compliant data), selects the BDAV directory different from the BDMV directory as the recording destination and performs the data recording process.

When the process in Step S103 or Step S104 is ended, the procedure goes to Step S105. In Step S105, whether or not any other AV stream to be recorded are present and, if yes, the process from Step S101 onward is repeated. When it is determined there is no other AV stream to be recorded in Step S105, the procedure goes to Step S106.

In Step S106, the management information (database) corresponding to the AV stream recorded in the BDMV directory is created and set in the BDMV directory, whereby the data structure in the BDMV directory is completed. When there is no AV stream recorded in the BDMV directory, this process is omitted.

Subsequently, in Step S107, management information (database) corresponding to the AV stream recorded in the BDAV directory is created and set in the BDAV directory, whereby the data structure in the BDAV directory is completed. If there is no AV stream recorded in the BDAV directory, this process is omitted.

Subsequently, in Step S108, management information corresponding to the recorded AV stream is created and set in the BU directory, whereby the data structure in the BU directory is completed. As described above, the management information set in the BU directory, for example, the index file [index.bdmv], and the movie object file [MovieObject.bdmv] are needed to be set as data including the management information on all of the recorded data in the BDMV directory in the medium and the expanded data recorded in the BDAV directory, and are renewed so as to record the management information corresponding to all the recorded data.

Furthermore, the playlist file, the clip information file corresponding to the stream file set in the BDAV directory are also read out and are subjected to a process of recording in the BU directory after having converted into a playlist file and a clip information file compliant with the BDMV standard.

In addition, the file name conversion table (manifest file (BUMF)) described above with reference to FIG. 6 is also subjected to a process of adding an entry corresponding to a stream file recorded newly in the BDAV directory.

The process in Step S108 corresponds to a process of creating or renewing management information to be applied to the reproduction by the virtual file system in which the recorded data in the respective BDMV/BDAV/BU directories are consolidated and recording the same in the BU directory. The management information includes the management information on all the data-to-be-reproduced recorded in the BDMV/BDAV directories. More specifically, it is management information including any one of the index file, the movie object file, the playlist file, and the clip information file to be applied to the reproducing process on the basis of the virtual file system.

Subsequently, the procedure goes to Step S109, where a renewing process including creating a virtual file system (VFS) construction program (BD-J) for merging the AV stream recorded in the BDAV directory with the BDMV directory and adding the same to the [BDJO], [JAR] in the BDMV directory is performed. For the reference sake, if the virtual file system (VFS) construction program (BD-J) is already created, this process needs not to be performed anew.

In this manner, the data recording process is performed.

Referring now to a flowchart shown in FIG. 9, a data reproducing process sequence will be described. The data reproducing process is executed in the data processing unit in the information processing apparatus. The data processing unit includes a CPU having an application program executing function. The processes in the respective steps of the flowchart shown in FIG. 9 will be described.

In Step S201, the program (BD-J) recorded in [BDJO], [JAR] set in the BDMV directory is executed in Step S201.

In Step S202, whether the reproducing apparatus is an apparatus of the related art which executes only the BDMV application in the related art, or an expanded apparatus which is capable of reproducing the expanded data produced by constructing the virtual file system (VFS) is determined. This determining process may include a process of determining the apparatus or the apparatus-packaged program using the program (BD-J) or may be performed using information entered by the user.

If the reproducing apparatus is the apparatus of the related art which executes only the BDMV application of the related art, the procedure goes to Step S203, where a reproducing process intended to reproduce only the data in the BDMV directory recorded in the media is executed.

In contrast, if the reproducing apparatus is the expanded apparatus which is capable of reproducing the expanded data produced by constructing the virtual file system (VFS), the procedure goes to Step S204.

In Step S204, a process of copying the AV stream data in the BDAV directory to the local memory by the execution of the BD-J program is performed. This process is a copying process for the local memory 120 of the stream file 201 described with reference to FIG. 7.

Subsequently, in Step S205, the BD-J program is executed to copy the management information file (including manifest file) in the BU directory to the local memory. This process is a copying process for the local memory 120 of the data 202 described with reference to FIG. 7.

Subsequently, in Step S206, the BD-J program is executed to output a virtual file system (VFS) construction request to the reproducing apparatus.

Subsequently, in Step S207, a reproducing process program (player) of the reproducing apparatus constructs a virtual file system (VFS) including the data in the BDMV directory and the data copied to the local memory. This process is the virtual file system (VFS) constructing process described with reference to FIG. 5, and is performed as a process of creating (b) the virtual package of the virtual file system (VFS) in FIG. 7 described with reference to FIG. 7.

Subsequently, in Step S208, the reproducing process is executed using the BDMV directory in the virtual package set in the virtual file system (VFS). When performing the reproducing process, if the data-to-be-reproduced is data stored in the local memory, a process of referencing the file name conversion table included in the management information in the local memory, acquiring a file name indicating the destination of recording of data from the file names on the virtual file system, and acquiring the data-to-be-reproduced is executed.

In this reproducing process, a reproducing process using the index file [index.bdmv], and the movie object file [MovieObject.bdmv] as the management information set in the BU directory described above with reference to FIG. 7 is performed. In the management information, the management information on all the data recorded in the BDMV directory and the BDAV directory are registered. When performing the reproducing process, a reproducing process using this management information as index information with respect to the data-to-be-reproduced is performed.

For example, the menu display is achieved by one program in the movie object file [MovieObject.bdmv] specified from the index file [index.bdmv]. In the menu, information for accessing all the data recorded in the BDMV directory and the BDAV directory is registered. Therefore, all of the BDMV standard data, and the expanded data (BDMV standard non-compliant data) can be reproduced using one menu.

For reference sake, as described above with reference to FIG. 7, the virtual file system also includes the BDJO, JAR directories set in the BDMV directory. Therefore, the Java (registered trademark) program stored in the BDJO, JAR directories can be used. By using the Java (registered trademark) program, the menu display having various designs is achieved. Also by using the Java (registered trademark) program, for example, the various control buttons can be displayed for achieving the reproducing process using the interactive function.

In addition, in this example, the reproduction is performed after having copied the BDMV standard non-compliant AV stream data and the management information to the local memory in S204 and S205. However, by recording the BDMV standard non-compliant AV stream in the BDAV directory, reproduction as data in the normal BDAV directly is also possible in the apparatus which is capable of decoding the BDMV standard non-compliant AV stream. In this case, although the menu screen of the BDMV, which can be displayed using the management information on the BU directory, is not displayed, a step of storing the AV stream to the local memory is not necessary.

In other words, the description given above is summarized as follows. The data in the BDMV directory can be reproduced by the BDMV reproducing mechanism of the related art. In contrast, the BDMV standard non-compliant data recorded in the BDAV directory can be reproduced as the BDMV data by performing a process from S204 to S208 in FIG. 9 if an interactive reproduction by displaying the menu compliant to the BDMV standard is wanted. In contrast, when the capacity of the local memory is not enough, or when the time for copying is not available, reproduction as the BDAV data is possible as long as a function of decoding the corresponding BDMV standard non-compliant AV stream is provided.

2-2. Example 2

Example in which Data Recording and Reproduction are Performed without Setting the BDAV Directory in a Recording Media Subsequently, an example in which data recording and reproduction are performed without setting the BDAV directory in a recording medium will be described as Example 2.

Figure 10:
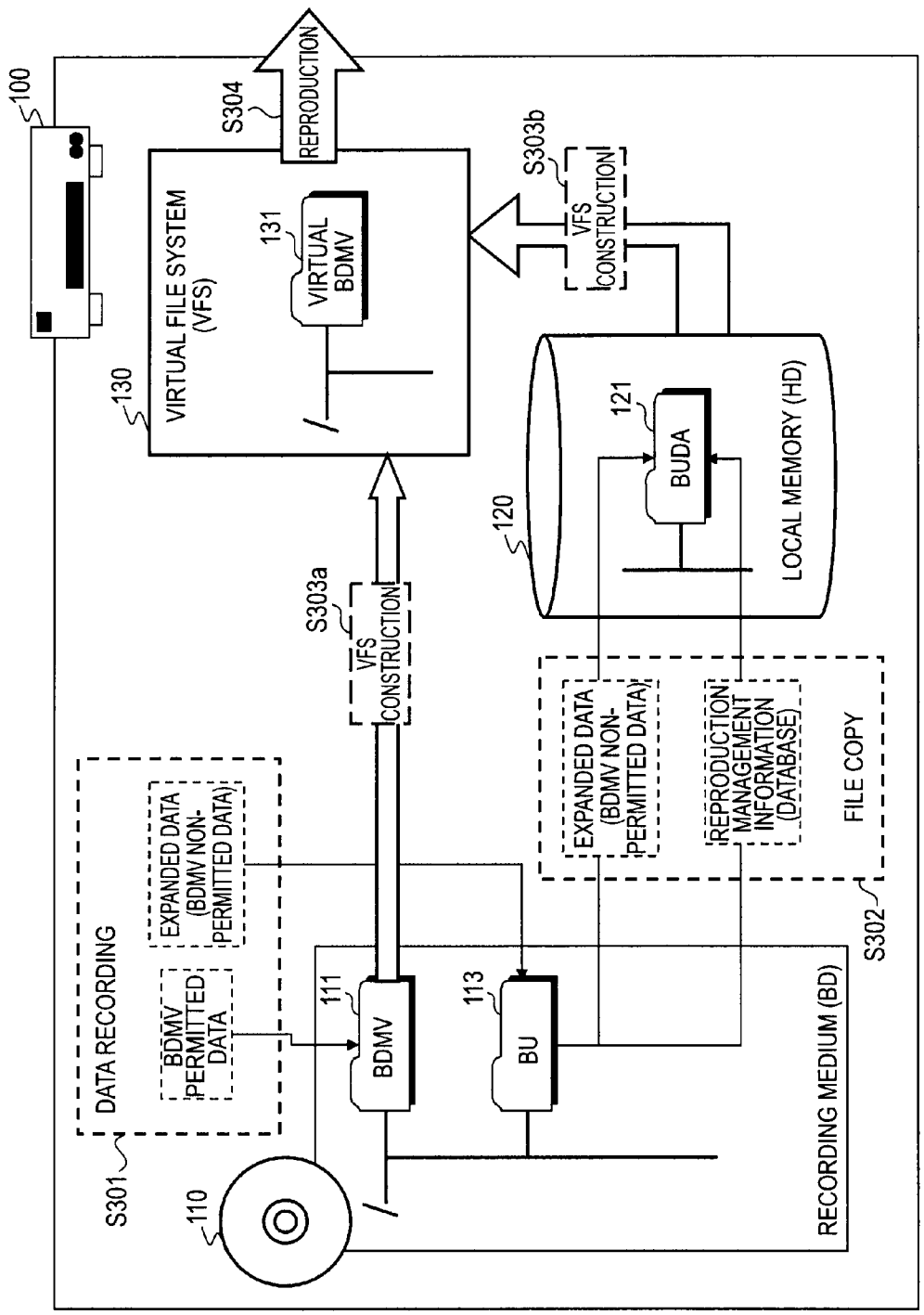
FIG. 10 is an explanatory drawing showing the outline of data recording and reproducing process according to a second embodiment of the present invention.

Referring now to FIG. 10, an outline of the data recording and reproducing process by the information processing apparatus according to Example 2 will be described. The information processing apparatus 100 shown in FIG. 10, having the medium (information recording medium) 110 loaded thereon, executes data recording and reproducing process. In this example as well, the medium 110 is, for example, a data recordable BD (Blu-ray Disc (registered trademark)). For reference sake, the medium 110 is not limited to the BD, but may be other media such as a flash memory.

The information processing apparatus 100 further includes the local memory 120 made up of a hard disk or the like, for example.

First of all, a data recording process for the medium 110 by the information processing apparatus 100 will be described. The medium 110 is assumed to be a data recordable medium such as a BD-RE or a BD-R. When performing only the reproducing process described later, a medium which is not rewritable, for example, the BD-ROM, may be used.

The information processing apparatus 100 sets
the BDMV directory 111, and
the BU directory 113
in the medium 110 as shown in FIG. 10. This process is executed by a program held by the information processing apparatus in the memory of the apparatus.

Unlike Example 1 described above with reference to FIG. 4 above, the BDAV directory is not used in Example 2.

The BDMV directory 111 is a directory having a similar configuration to that described above with reference to FIG. 1.

The BU directory 113 is a binding unit directory, and is a directory for recording management information and the like required when constructing the virtual file system (VFS) described later.

In Example 2, the AV stream files which are the expanded data (BDMV standard non-compliant data) are also recorded in the BU directory 113. All of the clip information files and the playlist files corresponding to these AV stream files are also recorded.

A process to be performed when the information processing apparatus 100 executes data recording on the medium 110 is shown in Step S301.

As shown in Step S301, when the data-to-be-recorded is a BDMV standard compliant data, the recording process is performed in the BDMV directory 111. Also, when recording the data having formats other than the BDMV standard compliant data, for example, the expanded data (BDMV standard non-compliant data) such as 1080/60p images, 3D images, and 4K×2K images, a process of recording in the BUV directory 113 is executed.

At the time of data recording process described above, creation or renewal and recording process are performed not only on the AV stream file, but also on the clip information file and the playlist file. In addition, a renewal process on the database files such as the movie object file and the index file on an as-needed basis.

When the data recording process is executed, the management information on the BU directory 113 is renewed. This process includes a management information renewal process required when constructing the virtual file system (VFS) described later.

In this manner, in Example 2, the information processing apparatus 100 executes the process of recording basically in the BDMV directory 111 for the BDMV standard compliant data, and executes the process of recording in the BU directory 113 for the expanded data (BDMV standard non-compliant data).

Subsequently, the outline of the data reproducing process will be described. The information processing apparatus 100 of Example 2 is capable of specifying both of the data recorded in the BDMV directory and the data set in the BU directory from one menu for the reproducing process. This menu is a menu creatable according to the BDMV standard.

Both of the data recorded in the BDMV directory and the data set in the BU directory can be reproduced using the interactive function which is available in the BDMV standard.

The menu display or the interactive function are executed as a process using the movie object file [MovieObject.bdmv], the BDJO directory [BDJO], or, for example, Java (registered trademark) recorded in the JAR directory [JAR] in the BDMV directory described above with reference to FIG. 1.

In the related art, these programs could not be used for the data recorded in directories other than the BDMV directory.

However, by using the virtual file system (VFS) set in the configuration of the present invention, the BDMV standard compliant menu function or the interactive function can be used also for the data recorded in the directories other than the BDMV directory.

At the time of reproducing process, as shown in Step S302 shown in FIG. 10, a process of copying an expansion data (BDMV standard non-compliant data) file (AV stream file) recorded in the BU directory 113 and the management information file or the like in the local memory 120 is performed as a first step. The result of copying is the BUDA 121 in the local memory 120 shown in the drawing. The BUDA means the binding unit data area.

Subsequently, in Step S303 (S303a, S303b), the binding process is performed on the respective data in the BDMV directory 111 and following directories recorded in the medium 110 and the BUDA 121 in the local memory to construct the virtual file system (VFS) 130.

In Step S304, the reproducing process using the constructed virtual file system (VFS) 130 is performed.

The virtual file system (VFS) 130 is a virtual file system used by a reproduction application executed by the information processing apparatus 100, and the virtual file system (VFS) described above with reference to FIG. 5.

Both of the BDMV standard compliant data recorded in the medium 110 and the expanded data (BDMV standard non-compliant data) copied in the local memory 120 are included in the virtual BDMV directory 131 of the virtual file system (VFS) 130. At the time of reproducing process, the both can be specified from one menu for reproduction. The menu can be created according to the menu creating program compliant with the BDMV standard.

The data set in the virtual BDMV directory 131 of the virtual file system (VFS) 130 is actually the data recorded in the medium 110 and a separate recording medium in the local memory 120. The reproduction application of the information processing apparatus 100 is capable of performing the reproducing process as if the virtual BDMV directory 131 of the virtual file system 130 is a directory set in a certain single media.

The information processing apparatus 100 which executes the content reproducing process performs the file name conversion process on the data stored in the local memory 120 when performing the reproducing process using the virtual file system (VFS) 130. The table applied to the conversion process is a file name conversion table (manifest file (BUMF)) described above with reference to FIG. 6.

Figure 11:
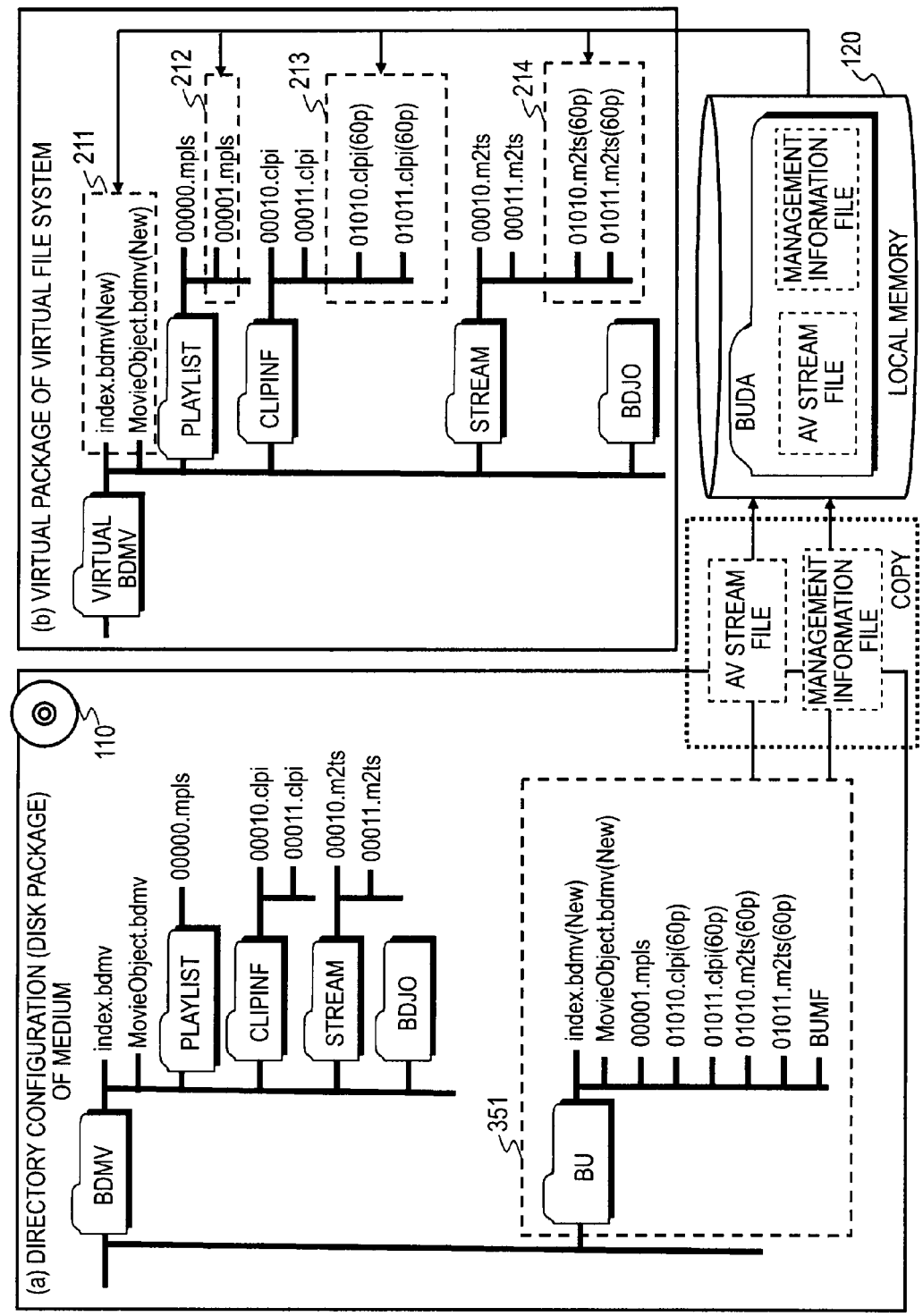
FIG. 11 is an explanatory drawing showing the directories to be set in the data recording and reproducing process, the virtual file system, and the example of data arrangement according to the second embodiment of the present invention.

Referring now to FIG. 11, examples of detailed recording of data and a setting process for the virtual file system (VFS) in Example 2 will be described. In FIG. 11, (a) Directory Configuration (disk package) of Medium (b) Virtual package of Virtual File System (VFS), and in addition, an example of the data recorded in the BUDA of the local memory 120 are shown.

(a) The directory configuration (disk package) of the medium is a configuration including the BDMV directory, the BU directory as described above with reference to FIG. 9.

In the BDMV directory, data compliant with the BDMV standard and the management information on the data are recorded.

In the BU directory, the BDMV standard non-compliant expanded data and management information on the expanded data, the management information file used when constructing the virtual file system (VFS), and the file name conversion table (manifest file (BUMF)) described above are recorded.

At the time of construction of the virtual file system, data 351 recorded in the BU directory are copied to the local memory 120.

The data copied to the local memory 120 is stored in the local memory as the BUDA 121, then the BUDA 121 and data in the BDMV directory in (a) the directory configuration (disk package) of medium are consolidated, so that (b) the virtual package in the virtual file system (VFS) is set.

Data set in the virtual BDMV shown in (b) in FIG. 11 is similar to the data configuration described above with reference to (b) in FIG. 7 in Example 1 above.

However, the stream file 214, which is data copied from the BDAV directory to the local memory in Example 1 described above, is data copied from the BU directory to the local memory 120 in this example.

The [index.bdmv (New)], [MovieObject.bdmv (New)] shown as the management information file 211 are originally the data 351 recorded in the BU directory and is the data in the BUDA 121 in the local memory 120.

Although the index file [index.bdmv], and the movie object file [MovieObject.bdmv] are set also in the BDMV directory in (a) the directory configuration (disk package) of the medium, when using the virtual file system, the index file [index.bdmv], and the movie object file [MovieObject.bdmv] in the data 202 recorded in the BU directory are used.

However, the index file [index.bdmv], and the movie object file [MovieObject.bdmv] of the data 351 recorded in the BU directory are set as data including not only the data recorded in the BDMV directory in the medium, but also the management information on the expanded data recorded in the BU directory.

In the reproducing process using the virtual file system, the reproducing process is performed not only on the data recorded in the BDMV direction in the medium, but also on the expanded data recorded in the BU directory, so that the index file [index.bdmv], and the movie object file [MovieObject.bdmv] in the data 202 recorded in the BU directory are set as the management information file 211 of the virtual BDMV.

In addition, the following files shown in (b) the virtual package of virtual file system (VFS), that is;

the playlist file [00001.mpls] 212 the clip information file [01010/clip] (60p) 213, the clip information file [01011/clip] (60p) 213, the AV stream file [01010/m2ts] (60p) 214, and the AV stream file [01011/m2ts] (60p) 214, are data of the BUDA 121 of the local memory 120.

The files 211 to 214 are acquired from the local memory 120 with reference to the file name conversion table (manifest file (BUMF)) described above with reference to FIG. 6. Other data are acquired from the BDMV directory in the medium 110.

The file name conversion table (manifest file (BUMF)) is copied to the local memory 120 as part of the data 351 recorded in the BU directory and the application for executing the reproducing process is used by referencing the file name conversion table (manifest file (BUMF)) recorded in the local memory 120.

In Example 2 as well, in the same manner as Example 1 described above, the BDJO, JAR directories set in the BDMV directory are included in the virtual file system as shown in (b) in FIG. 11. Therefore, at the time of reproducing process using the virtual file system, the Java (registered trademark) program stored in the BDJO, JAR directories can be used. By using the Java (registered trademark) program, the menu display having various designs is achieved. Also by using the Java (registered trademark) program stored in the BDJO, JAR directories, for example, various control buttons can be displayed for achieving the reproducing process using the interactive function.

Figure 12:
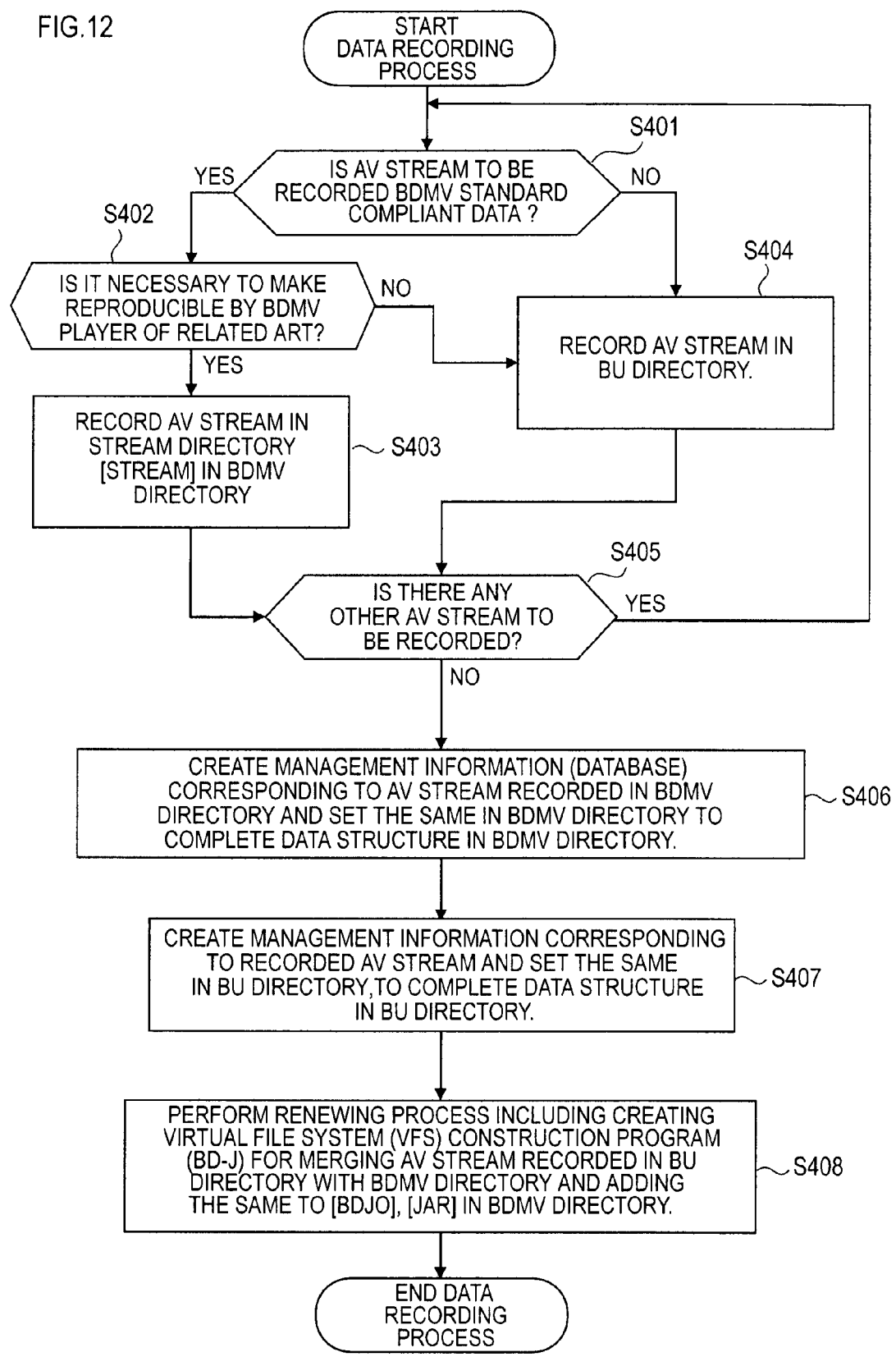
FIG. 12 is a drawing showing a flowchart for explaining a sequence of the data recording process according to the second embodiment of the present invention.
Figure 13:
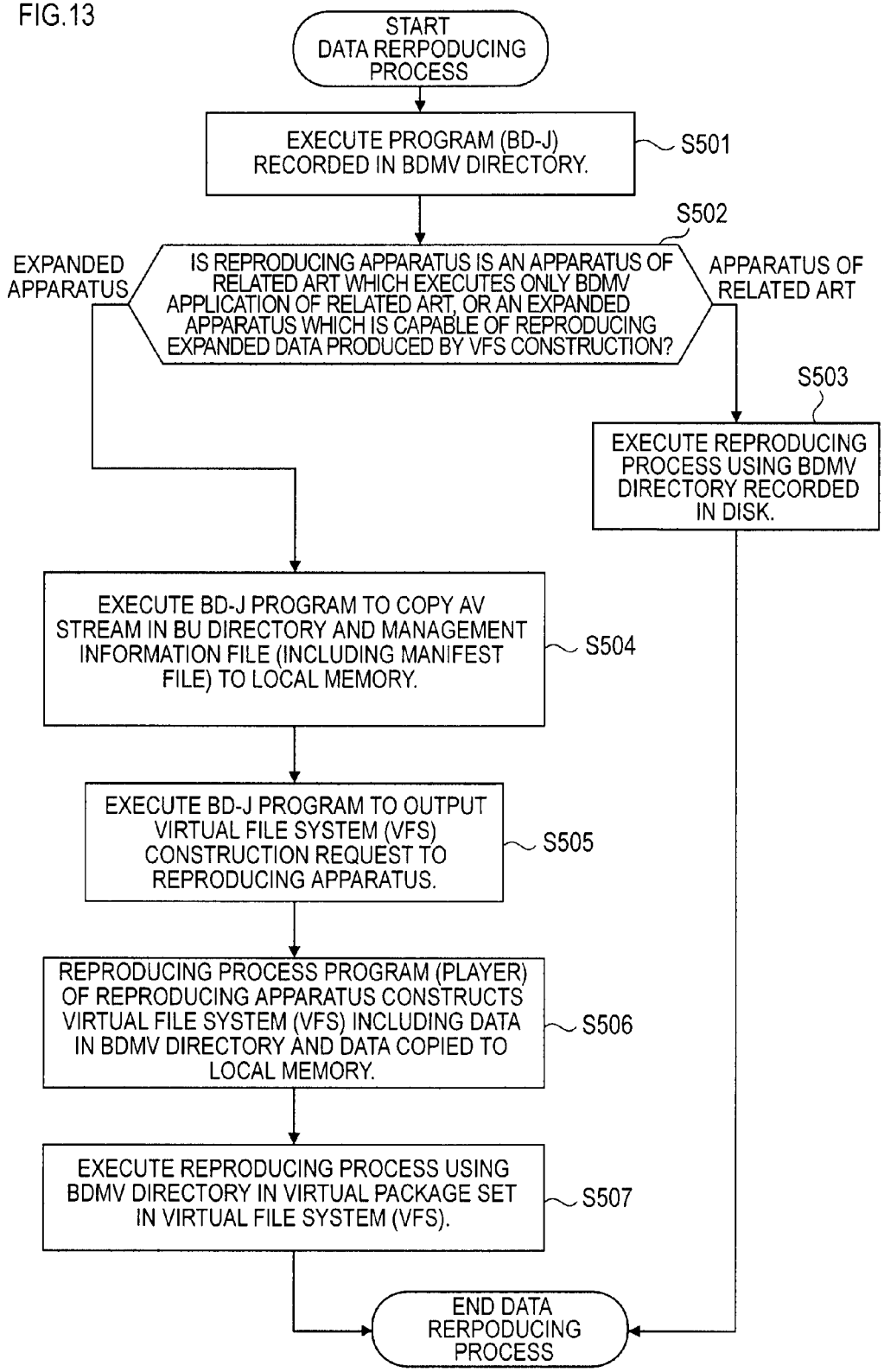
FIG. 13 is a drawing showing a flowchart for explaining a sequence of the data reproducing process according to the second embodiment of the present invention.

Referring now to flowcharts shown in FIG. 12 and FIG. 13, a data recording process sequence and a data reproducing process according to this example will be described.

Referring first to the flowchart shown in FIG. 12, the data recording process sequence in this example will be described.

The data recording process is executed by the data processing unit in the information processing apparatus. The data processing unit includes a CPU having an application program executing function. The processes in the respective steps of the flowchart shown in FIG. 12 will be described.

In Step S401, the AV stream to be recorded is whether or not the BDMV standard compliant data is determined. As described above, for example, in the case of the BDMV application standard, recording and reproducing of the [1080/60p image] or 3D images as three-dimensional images, or 4K×2K images having approximately 4000×2000 pixels are not permitted. When recording these data, the determination in Step S401 is No.

For example, if the AV stream to be recorded is the BDMV standard compliant data such as [1080/60i image], the determination in Step S401 is Yes, and the procedure goes to Step S402.

In Step S402, whether or not it is necessary to make the BDMV standard compliant data reproducible by using the BDMV player of the related art is determined. This determination may be performed by the user, or either setting may be decided in advance. The determining process in Step S402 is a determination step for permitting even the BDMV standard data-to-be-recorded in the BU directory. In other words, in a case where all the BDMV standard compliant data are set to be recorded in the BU directory, the determining process in Step S402 may be omitted.

If the result of determination in Step S402 is Yes, the procedure goes to Step S403, and the AV stream is recorded in the stream directory [STREAM] in the BDMV directory.

In contrast, if the result of determination in Step S401 is No, that is, if the data-to-be-recorded is an expanded data which is not the BDMV standard compliant data, and if the result of determination in Step S402 is No, that is, the data-to-be-recorded is a BDMV standard compliant data is to be recorded in the BU directory, the procedure goes to Step S404.

In Step S404, the AV stream is recorded in the BU directory.

In this manner, the information processing apparatus in this example determines whether or not the data-to-be-recorded in the recording media is the standard compliant data compliant to the BDMV standard and, when it is the BDMV standard compliant data, selects the BDMV directory to record the BDMV standard compliant data set in the recording media as the recording destination on a priority basis and, when the data-to-be-recorded is the expanded data (BDMV standard non-compliant data), selects the BU directory different from the BDMV directory as the recording destination and performs the data recording process.

When the process in Step S403 or Step S404 is ended, the procedure goes to Step S405. In Step S405, whether or not any other AV stream to be recorded is present and, if yes, the process from Step S401 onward is repeated. When it is determined there is no other AV stream to be recorded in Step S405, the procedure goes to Step S406.

In Step S406, the management information (database) corresponding to the AV stream recorded in the BDMV directory is created and set the same in the BDMV directory, whereby the data structure in the BDMV directory is completed. When there is no AV stream recorded in the BDMV directory, this process can be omitted.

Subsequently, in Step S407, management information corresponding to the recorded AV stream is created and set in the BU directory, whereby the data structure in the BU directory is completed. In this example, the management information set in the BU directory, for example, the index file [index.bdmv], and the movie object file [MovieObject.bdmv] need to be set as data including the management information on all of the data recorded in the BDMV directory and the expanded data recorded in the BU directory in the medium, so that renewal to record the management information corresponding to all the recorded data is performed.

In addition, the file name conversion table (manifest file (BUMF)) described above with reference to FIG. 6 is also subjected to a process of adding an entry corresponding to a stream file recorded newly in the BU directory.

The process in Step S407 corresponds to a process of creating or renewing the management information to be applied to the reproduction by the virtual file system in which the recorded data in the respective BDMV/BU directories are consolidated and recording the same in the BU directory. The management information includes the management information on all the data-to-be-reproduced recorded in the BDMV/BU directories. More specifically, it is the management information including any one of the index file, the movie object file, the playlist file, and the clip information file to be applied to the reproducing process on the basis of the virtual file system.

Subsequently, the procedure goes to Step S408, where a renewing process including creating a virtual file system (VFS) construction program (BD-J) for merging the AV stream recorded in the BU directory with the BDMV directory and adding the same to the [BDJO], [JAR] in the BDMV directory is performed. If the virtual file system (VFS) construction program (BD-J) is already created, this process needs not to be performed again.

In this manner, the data recording process is performed.

Referring now to a flowchart shown in FIG. 13, the data reproducing process sequence will be described. The data reproducing process is executed in the data processing unit in the information processing apparatus. The data processing unit includes the CPU having the application program executing function. The processes in the respective steps of the flowchart shown in FIG. 13 will be described.

In Step S501, the program (BD-J) recorded in [BDJO], [JAR] set in the BDMV directory is executed in Step S501.

In Step S502, whether the reproducing apparatus is the apparatus of the related art which executes only the BDMV application of the related art, or the expanded apparatus which is capable of reproducing the expanded data produced by constructing the virtual file system (VFS) is determined. This determining process may include a process of determining the apparatus or the apparatus-packaged program using the program (BD-J) or may be performed using information entered by the user.

If the reproducing apparatus is the apparatus of the related art which executes only the BDMV application of the related art, the procedure goes to Step S503, where the reproducing process intended to reproduce only the data in the BDMV directory recorded in the media is executed.

In contrast, if the reproducing apparatus is the expanded apparatus which is capable of reproducing the expanded data produced by constructing the virtual file system (VFS), the procedure goes to Step S504.

In Step S504, a process of copying the data in the BU directory to the local memory by the execution of the BD-J program is performed. This process is a copying process for the local memory 120 of the data 351 described with reference to FIG. 11. The data to be copied includes the expanded data (BDMV standard non-compliant stream data) and the management information file in the BU directory (including manifest file).

Subsequently, in Step S505, the BD-J program is executed to output the virtual file system (VFS) construction request to the reproducing apparatus.

Subsequently, in Step S506, the reproducing process program (player) of the reproducing apparatus constructs the virtual file system (VFS) including the data in the BDMV directory and the data copied to the local memory. This process is the virtual file system (VFS) constructing process described with reference to FIG. 5, and is performed as a process of creating (b) the virtual package of the virtual file system (VFS) in FIG. 11 described with reference to FIG. 11.

Subsequently, in Step S507, the reproducing process is executed using the BDMV directory in the virtual package set in the virtual file system (VFS). For reference sake, when performing the reproducing process, if the data-to-be-reproduced is data stored in the local memory, a process of referencing the file name conversion table included in the management information in the local memory, acquiring a file name indicating the destination of recording of data from the file names on the virtual file system, and acquiring the data-to-be-reproduced is executed.

In this reproducing process, a reproducing process using the index file [index.bdmv], and the movie object file [MovieObject.bdmv] as the management information set in the BU directory described above with reference to FIG. 11 is performed. In these management information, the management information on all the data recorded in the BDMV directory and the BU directory are registered. When performing the reproducing process, a reproducing process using this management information as index information with respect to the data-to-be-reproduced is performed.

For example, the menu display is achieved by one program in the movie object file [MovieObject.bdmv] specified from the index file [index.bdmv]. In the menu, information for accessing all the data recorded in the BDMV directory and the BU directory is registered. Therefore, all of the BDMV standard data, and the expanded data (BDMV standard non-compliant data) can be reproduced using one menu.

For reference sake, as described above with reference to FIG. 11, the virtual file system also includes the BDJO, JAR directories set in the BDMV directory. Therefore, the Java (registered trademark) program stored in the BDJO, JAR directories can be used. By using the Java (registered trademark) program, the menu display having various designs is achieved. Also by using the Java (registered trademark) program, for example, the various control buttons can be displayed for achieving the reproducing process using the interactive function.

[3. Example of Configuration of Information Processing Apparatus]

Figure 14:
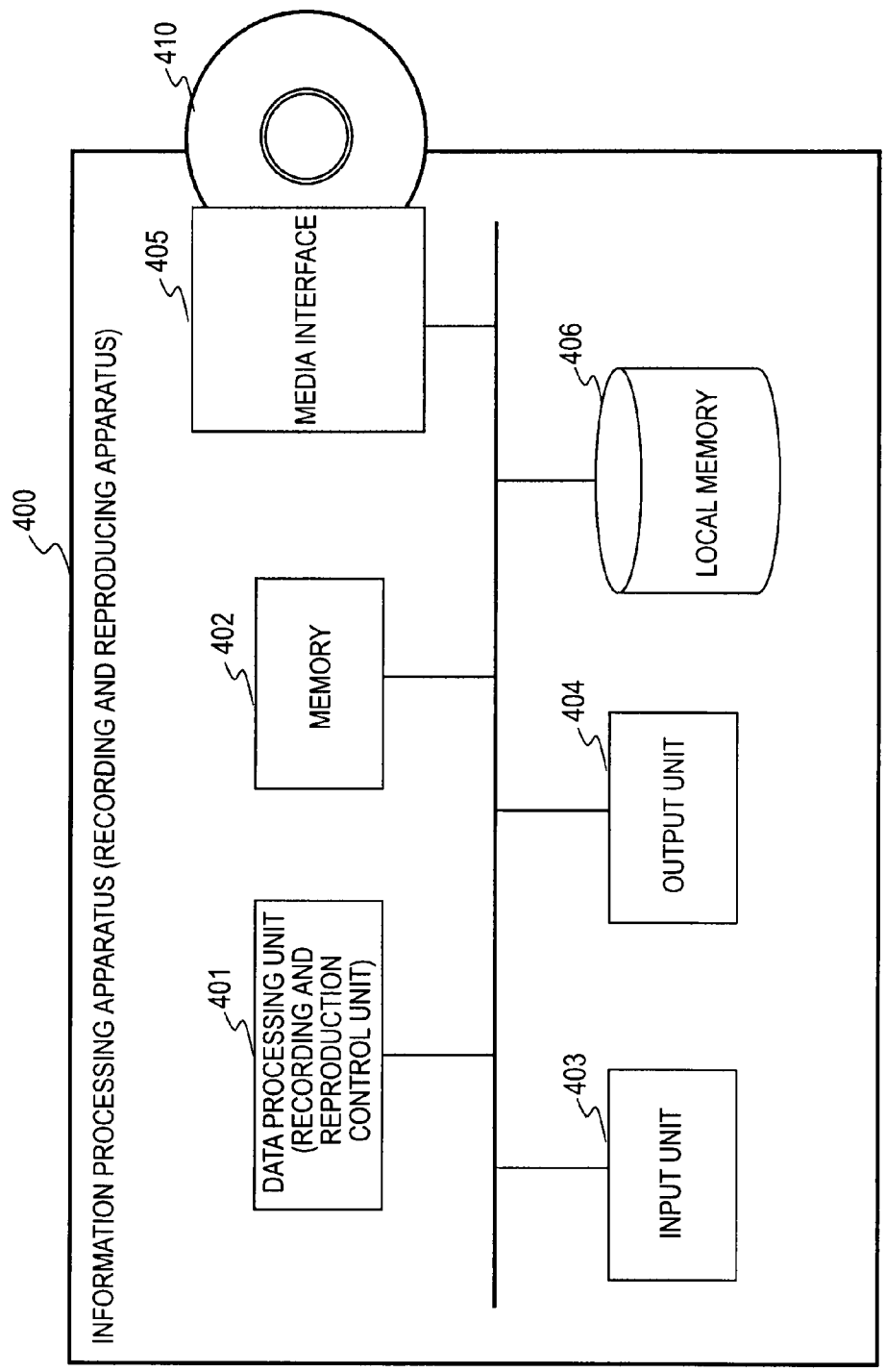
FIG. 14 is an explanatory drawing showing a configuration of an information processing apparatus according to an embodiment of the present invention.

Referring now to FIG. 14, an example of configuration of the information processing apparatus that executes the recording and reproducing process described above will be described. FIG. 14 is a block diagram showing an example of configuration of an information processing apparatus 400 according to an example of the present invention. The information processing apparatus 400 is an apparatus configured to perform at least either one of processes of data recording or data reproduction with respect to a medium 410. More specifically, for example, the information processing apparatus 400 is an apparatus such as a recording and reproducing apparatus, a player apparatus, a recorder apparatus, a video camera, and a PC.

For reference sake, although a disk-type medium is shown as the medium 410 in FIG. 14, the medium is not limited to the disk-type medium and may be a medium such as a flash memory.

As shown in FIG. 14, the information processing apparatus 400 includes a data processing unit (recording and reproducing control unit) 401, a memory 402, an input unit 403, an output unit 404, a media interface 405, and a local memory 406.

The data processing unit 401 includes a CPU having a program executing function for executing various data processing programs. For example, an application program for performing a data recording and reproducing process is executed. For example, processes according to the flowcharts described with reference to FIG. 8 and FIG. 9 in Example 1 described above, or processes according to the flowcharts described with reference to FIG. 12 and FIG. 13 in Example 2 are executed.

The memory 402 is made up of a RAM, a ROM, or the like, and is used as a storage area for storing the application programs executed by the data processing unit 401. The memory 402 is used as parameters for application, or a work area and, in addition, is also used as a buffer area for media recording data.

The input unit 403 is, for example, an operation unit for users, and allows various inputs such as an input of data recording or reproducing command. The input unit 403 also includes a remote controller, and allows an input of remote controller operation information. The output unit 404 is an output unit for images or voices, which is made up of a display, a speaker, or the like.

The media interface 405 is an interface applied to the data recording and reproducing process using the medium 410. The data is written in the medium 410 according to a request from the data processing unit 401, and a data reading process from the medium 410 or the like is performed.

The local memory 406 is made up of, for example, a hard disk or the like. At the time of constructing the virtual file system described in Example shown above, copy data from the medium 410 is stored. In other words, it is used as a storage area for the expansion data (BDMV standard non-compliant data), the management information, and the file name conversion table (manifest file (BUMF)). It is also used as the storage area for other programs.

The present invention has been described in detail with reference to specific examples. However, it is apparent that those skilled in the art can correct or replace the examples without departing the scope of the present invention. In other word, the present invention has been disclosed in the form of exemplification, and should not be interpreted restrictively. In order to determine the scope of the present invention, appended claims are to be made allowance for.

A series of processes described in the specification may be executed by hardware, software, or a composite configuration including the both. Execution of the process by software is achieved by installing the program having the process sequence recorded therein in a memory of a computer, which is built in a specific hardware, and causing the computer to execute the process or, alternatively, by installing the program in a general computer which is capable of executing various processes and causing the computer to execute the process. For example, the program may be recorded in the recording media in advance. In addition to installing from the recording medium to the computer, it is also possible to receive the program via a network such as LAN (Local Area Network) or internet and installing the same in a recording medium such as an integrated hard disk.

The various processes described in the specification may be executed not only in time sequence according to the description, but also in parallel or individually according to a processing capability of the apparatus which executes the process. In this specification, the term "system" means a configuration of a logical set of a plurality of apparatuses, and is not limited to those having a plurality of apparatuses of various configurations in an identical housing.

INDUSTRIAL APPLICATION

As described thus far, according to an example of the present invention, a plurality of the directories are set in one single recording media such as a BD, and a recording destination directory is selected according to data types to perform the recording process. For example, the BDMV standard compliant data is recorded in the BDMV directory, and the BDMV standard non-compliant data, for example, 1080/60p or 3D image data are recorded in the BDAV directory or the BU directory. At the time of data reproducing process, the virtual file system in which the recorded data in the BDMV directory and the recorded data in the BDAV or the BU directory are consolidated is constructed to achieve the reproducing process using the virtual file system. With this configuration, the recording and reproducing of the BDMV standard compliant data and the BDMV standard non-compliant data can be performed in a new system without causing an adverse effect on the existing system.

REFERENCE SIGNS LIST 100 information processing apparatus
110 medium (information recording medium)
111 BDMV directory
112 BDAV directory
113 BU directory
120 local memory
121 BUDA
130 virtual file system
131 virtual BDMV directory
150 application program
151 file name conversion table (manifest file (BUMF))
400 information processing apparatus
401 data processing unit
402 memory
403 input unit
404 output unit
405 media interface
406 local memory
410 medium

The invention claimed is:

1. An information processing apparatus comprising:
   circuitry configured to
      perform a data recording process on a recording medium;
      determine whether or not data-to-be-recorded in the recording medium is standard compliant data compliant with a first application standard;
      select a first directory set in the recording medium for recording the first application standard compliant data as a recording destination on a priority basis when the data-to-be-recorded is the standard compliant data;
      select a second directory different from the first directory as a recording destination when the data-to-be-recorded is standard non-compliant data and performs a data recording process;
      create or renew management information to be applied to a reproduction by a virtual file system in which the recorded data in the first and second directories are consolidated and performs a process of recording the created or renewed management information in the recording medium; and
      perform, when recording of the data-to-be-reproduced whose recording destination is a directory different from the first directory is executed, a process of adding an entry including a file name indicating recording destination of the data-to-be-reproduced and a file name on the virtual file system in one-to-one correspondence in a file name conversion table included in the management information.

2. The information processing apparatus according to claim 1, wherein the circuitry is configured to:
   create or renew the management information including the management information on all the data-to-be-reproduced recorded in the first directory and the second directory as the management information and records the created or renewed management information in the recording medium.

3. The information processing apparatus according to claim 2, wherein the circuitry is configured to:
   perform a process of creating or renewing the management information including any one of an index file, a movie object file, a playlist file, and a clip information file to be applied to a reproducing process on the basis of the virtual file system and recording the created or renewed management information in the recording medium.

4. The information processing apparatus according to claim 1, wherein the circuitry is configured to:
   select the first directory as the recording destination when the data-to-be-recorded is the standard compliant data and is made to be reproducible without applying the virtual file system; and
   select the second directory as the recording destination when the data-to-be-recorded is the standard compliant data and is made to be reproducible only when the virtual file system is applied.

5. The information processing apparatus according to claim 1, wherein the first application standard is a BDMV standard, the first directory is a BDMV directory, and a second directory is a BDAV directory.

6. The information processing apparatus according to claim 5, wherein the directory for recording the management information is a third directory different from the BDMV directory and the BDAV directory.

7. The information processing apparatus according to claim 1, wherein the first application standard is the BDMV standard, the first directory is the BDMV directory, and the second directory is a directory for recording a BDMV standard non-compliant data and the management information.

8. An information processing method for executing data recording in a recording medium in an information processing apparatus comprising:
   a step of determining whether or not data-to-be-recorded in the recording medium is standard compliant data compliant with a first application standard by a data processing unit;
   a step of selecting a first directory set in the recording medium for recording the first application standard compliant data as a recording destination on a priority basis when the data-to-be-recorded is the standard compliant data and selecting a second directory different from the first directory as a recording destination to perform a data recording process when the data-to-be-recorded is the standard non-compliant data by the data processing unit;

a step of creating or renewing management information to be applied to a reproduction by a virtual file system in which the recorded data in the first and second directories are consolidated and recording the management information in the recording medium by the data processing unit; and a step of performing, when recording of the data-to-be-reproduced whose recording destination is a directory different from the first directory is executed, a process of adding an entry including a file name indicating recording destination of the data-to-be-reproduced and a file name on the virtual file system in one-to-one correspondence in a file name conversion table included in the management information.

9. A non-transitory computer-readable medium including a program that causes an information processing apparatus to execute data recording in a recording medium comprising:

a step of causing a data processing unit to determine whether or not data-to-be-recorded in the recording medium is standard compliant data compliant with a first application standard;

a step of causing the data processing unit to select a first directory set in the recording media for recording the first application standard compliant data as a recording destination on a priority basis when the data-to-be-recorded is a standard compliant data and select a second directory different from the first directory as the recording destination and perform the data recording process when it is the standard non-compliant data;

a step of causing the data processing unit to create or renew management information to be applied to a reproduction by a virtual file system in which the recorded data in the first and second directories are consolidated and record the management information in the recording medium; and a step of performing, when recording of the data-to-be-reproduced whose recording destination is a directory different from the first directory is executed, a process of adding an entry including a file name indicating recording destination of the data-to-be-reproduced and a file name on the virtual file system in one-to-one correspondence in a file name conversion table included in the management information.

* * * * *